(12) United States Patent
Won et al.

(10) Patent No.: US 9,806,778 B2
(45) Date of Patent: Oct. 31, 2017

(54) METHOD AND APPARATUS FOR MAPPING VIRTUAL ANTENNA TO PHYSICAL ANTENNA

(71) Applicant: Electronics and Telecommunications Research Institute, Daejeon (KR)

(72) Inventors: Seok Ho Won, Daejeon (KR); Seyoung Cho, Daejeon (KR); Suchang Chae, Daejeon (KR); Il Gyu Kim, Chungcheongbuk-do (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/937,960

(22) Filed: Nov. 11, 2015

(65) Prior Publication Data

US 2016/0149619 A1    May 26, 2016

(30) Foreign Application Priority Data

Nov. 11, 2014  (KR) .......................... 10-2014-0156383
Jun. 15, 2015   (KR) .......................... 10-2015-0084315
Nov. 6, 2015    (KR) .......................... 10-2015-0156182

(51) Int. Cl.
  *H04L 27/00*   (2006.01)
  *H01Q 3/00*    (2006.01)
  (Continued)

(52) U.S. Cl.
  CPC .......... *H04B 7/046* (2013.01); *H04B 7/0417* (2013.01); *H04B 7/0669* (2013.01)

(58) Field of Classification Search
  CPC .... H04B 7/046; H04B 7/0417; H04B 7/0626; H04B 7/0413; H04B 7/0632; H04B 7/066; H04B 1/02
  (Continued)

(56) References Cited

U.S. PATENT DOCUMENTS 7,429,949 B1 *  9/2008  Trigui ....................... H01Q 3/30
                                                          342/372
7,848,218 B2   12/2010  Lee et al.
(Continued)

FOREIGN PATENT DOCUMENTS

KR    1020100088555 A    8/2010
KR    1020110103617 A    9/2011
(Continued)

OTHER PUBLICATIONS

Farooq Khan, "LTE for 4G Mobile Broadband," 2009, pp. 110-147, Cambridge University Press.
(Continued)

*Primary Examiner* — Daniel Washburn
*Assistant Examiner* — Sarah Hassan
(74) *Attorney, Agent, or Firm* — William Park & Associates Ltd.

(57) ABSTRACT

A transmitter generates a first precoding vector for a first virtual antenna port among a plurality of virtual antenna ports using a first sequence having a constant magnitude and a discrete Fourier transform (DFT) vector sequence in a time domain and a frequency domain. The transmitter generates a plurality of second precoding vectors for the remaining virtual antenna port, except for the first virtual antenna port of the plurality of virtual antenna ports by circular shifting the first precoding vector. The transmitter maps a plurality of first data streams for the plurality of virtual antenna ports to a plurality of physical antenna ports using the first precoding vector and the plurality of second precoding vectors.

6 Claims, 27 Drawing Sheets

(51) Int. Cl.
*H04B 7/04* (2017.01)
*H04B 7/0417* (2017.01)
*H04B 7/06* (2006.01)

(58) Field of Classification Search
USPC .......................................... 375/295; 342/372
See application file for complete search history.

(56) References Cited

U.S. PATENT DOCUMENTS

| | | | |
|---|---|---|---|
| 8,953,713 | B2 | 2/2015 | Sambhwani et al. |
| 2008/0214198 | A1* | 9/2008 | Chen ..................... H04L 1/0026 455/450 |
| 2010/0091905 | A1* | 4/2010 | Khan .................... H04L 5/0023 375/296 |
| 2010/0246712 | A1* | 9/2010 | Suo ...................... H04B 7/0617 375/295 |
| 2011/0134747 | A1* | 6/2011 | Kwon ................... H04L 1/1607 370/208 |
| 2011/0223876 | A1 | 9/2011 | Kang |
| 2011/0235608 | A1* | 9/2011 | Koo ....................... H04B 7/024 370/329 |
| 2011/0281536 | A1 | 11/2011 | Lee et al. |
| 2012/0002740 | A1* | 1/2012 | Han ..................... H04L 5/0048 375/260 |
| 2012/0052896 | A1 | 3/2012 | Li et al. |
| 2013/0155891 | A1* | 6/2013 | Dinan .................. H04B 7/0456 370/252 |
| 2014/0204853 | A1 | 7/2014 | Ko et al. |
| 2014/0247897 | A1 | 9/2014 | Kang |

FOREIGN PATENT DOCUMENTS

| | | |
|---|---|---|
| KR | 1020110112866 A | 10/2011 |
| KR | 1020120010268 A | 2/2012 |

OTHER PUBLICATIONS

Kishor Chandra et al., "Adaptive Beamwidth Selection for Contention Based Access Periods in Millimeter Wave WLANs," Consumer Communications and Networking Conference (CCNC), Jan. 2014, pp. 458-464, IEEE.

Xuezhi Yang et al., "A Random Beamforming Technique for Omnidirectional Coverage in Multiple-Antenna Systems," IEEE Transaction on Vehicular Technology, Mar. 2013, pp. 1420-1425, vol. 62, No. 3, IEEE.

Wen-Qin Wang, "Virtual Antenna Array Analysis for MIMO Synthetic Aperture Radars," International Journal of Antennas and Propagation, vol. 2012, 2012, pp. 1-10, Hindawi Publishing Corporation.

* cited by examiner

FIG. 5

| beam 0 (e.g., $w^{(1)}$) | beam 1 (e.g., $w^{(2)}$) |
|---|---|
| 0.10406091 + j*(-0.24340395) | -0.10406091 + j*(+0.243403950) |
| 0.21346685 + j*(-0.16386886) | 0.21346685 + j*(-0.163868865) |
| 0.33082736 + j*(+0.15179771) | -0.33082736 + j*(-0.151797713) |
| -0.16340539 + j*(+0.38933753) | -0.16340539 + j*(+0.389337535) |
| -0.01444333 + j*(-0.31956201) | 0.01444333 + j*(+0.319562010) |
| -0.08058383 + j*(+0.40658344) | -0.08058383 + j*(+0.406583448) |
| 0.40698542 + j*(+0.03329345) | -0.40698542 + j*(-0.033293459) |
| 0.20309201 + j*(-0.25417733) | 0.20309201 + j*(-0.254177330) |

Different antenna beamwidth patterns defined in IEEE 802.11ad.

METHOD AND APPARATUS FOR MAPPING VIRTUAL ANTENNA TO PHYSICAL ANTENNA

CROSS-REFERENCE TO RELATED APPLICATION

This application claims priority to and the benefit of Korean Patent Application Nos. 10-2014-0156383, 10-2015-0084315 and 10-2015-0156182 filed in the Korean Intellectual Property Office on Nov. 11, 2014, Jun. 15, 2015 and Nov. 6, 2015, the entire contents of which are incorporated herein by reference.

BACKGROUND OF THE INVENTION (a) Field of the Invention

The present invention relates to a method and apparatus for optimally mapping a virtual antenna (or virtual antenna port) to a physical antenna (or physical antenna port).

(b) Description of the Related Art

As a major method for increasing a wireless capacity, multiple antenna technology is used. Particularly, in order to increase a wireless capacity, when a wireless transmission protocol (e.g., Long term evolution (LTE)-advanced (A) base station of a $3^{rd}$ generation partnership project (3GPP)) much requiring transmitting antennas of a base station is implemented, many antennas are physically mounted. Such a multiple antenna system increases the number of transmitting radio frequency (RF) paths and antennas as well as increase of a capacity. Therefore, when total transmission power is constant, transmission power per antenna decreases and thus a cost of a RF component such as a low specification of power amplifier (PA) may reduce. Thereby, a system may be economically constructed.

However, when a new transmission protocol having many antennas is implemented, a problem that a service should be simultaneously provided to terminals of an existing transmission protocol having the relatively small antenna number, i.e., backward compatibility is regarded as an important problem. As a detailed example, a base station (e.g., eNode-B or base station) of an LTE-A specification (e.g., LTE specification of Release 10 or more) should provide a service even to a terminal (e.g., UE or user equipment) that has 8 antennas and that has a legacy LTE specification (e.g., LTE specification of Release 8 or Release 9, hereinafter, referred to as 'Rel. 8 LTE specification'). In this case, because the terminal of a Rel. 8 LTE specification is recognized to have only maximum four antennas by the base station, the base station of an LTE-A specification requires a particular antenna transmission method. That is, a technique of transmitting transmission data for the terminal of a Rel. 8 LTE specification through four virtual antennas, but actually transmitting data through 8 physical channels (or 8 physical antennas) is requested.

SUMMARY OF THE INVENTION

The present invention has been made in an effort to provide a method and apparatus having advantages of optimally mapping a virtual antenna to a physical antenna.

An exemplary embodiment of the present invention provides a method in which a transmitter maps a plurality of virtual antenna ports to a plurality of physical antenna ports. The method includes: generating a first precoding vector for a first virtual antenna port of the plurality of virtual antenna ports using a first sequence having a constant magnitude in a time domain and a frequency domain and a discrete Fourier transform (DFT) vector sequence; generating a plurality of second precoding vectors for the remaining virtual antenna ports, except for the first virtual antenna port of the plurality of virtual antenna ports by circular shifting the first precoding vector; and mapping a plurality of first data streams for the plurality of virtual antenna ports to the plurality of physical antenna ports using the first precoding vector and the plurality of second precoding vectors.

The generating of a first precoding vector may include generating the first precoding vector by the scalar product of a Zadoff-Chu sequence, which is the first sequence, and the DFT vector sequence.

The generating of a plurality of second precoding vectors may include: generating one of the plurality of second precoding vectors by circular shifting elements of the first precoding vector by a first shift value; generating another vector of the plurality of second precoding vectors by circular shifting elements of the first precoding vector by a second shift value; and generating another vector of the plurality of second precoding vectors by circular shifting elements of the first precoding vector by a third shift value.

The first shift value may be a value corresponding to the element number/2 of the first precoding vector, the second shift value may be a value corresponding to the element number/4 of the first precoding vector, and the third shift value may be a value corresponding to the element number/8 of the first precoding vector.

The mapping of a plurality of first data streams may include: generating the M number (M is the natural number of 3 or more) of second data streams by precoding one of the plurality of first data streams based on the first precoding vector; and generating the M×(N−1) number of third data streams by precoding the remaining (N−1) number (N<M) of first data streams of the plurality of first data streams based on the (N−1) number of second precoding vectors.

The mapping of a plurality of first data streams may further include: multiple-channel adding one of the M number of second data streams and the (N−1) number of third data streams of the M×(N−1) number of third data streams; and mapping the multiple-channel added data streams to one of the M number of physical antenna ports.

Another embodiment of the present invention provides a method in which a transmitter maps a plurality of virtual antenna ports to a plurality of physical antenna ports. The method includes: generating a plurality of first shift sequences by circular shifting a first sequence having a constant magnitude in a time domain and a frequency domain; generating a plurality of second shift sequences by circular shifting a discrete Fourier transform (DFT) vector sequence; generating a plurality of precoding vectors for the plurality of virtual antenna ports using the plurality of first shift sequences and the plurality of second shift sequences; and mapping a plurality of first data streams for the plurality of virtual antenna ports to the plurality of physical antenna ports using the plurality of precoding vectors.

The generating of a plurality of second shift sequences may include: generating the DFT vector sequence; and generating the plurality of second shift sequences by circular shifting the DFT vector sequence using a different plurality of second shift values.

The generating of a plurality of precoding vectors may include: randomly selecting one of the plurality of first shift sequences; randomly selecting one of the plurality of second shift sequences; and generating one of the plurality of precoding vectors by the scalar product of the selected first shift sequence and the selected second shift sequence.

The mapping of a plurality of first data streams may include: generating the (M×N) number (M>N) of second data streams by precoding the N number (N is the natural number of 2 or more) of first data streams based on the N number of precoding vectors; multiple-channel adding the N number of second data streams of the (M×N) number of second data streams; and mapping the multiple-channel added data streams to one of the M number of physical antenna ports.

Yet another embodiment of the present invention provides a method of mapping an antenna of a transmitter. The method includes: configuring P, which is the number of pseudo antenna ports for controlling a width of a first beam to be larger than N, which is the number of physical antenna ports; generating the P number of second data streams by precoding a first data stream for a first virtual antenna port based on a first precoding vector for the first virtual antenna port; generating the N number of third data streams using a portion of the P number of second data streams; and mapping the N number of third data streams to the N number of physical antenna ports.

The configuring of P may include: configuring the P to a value larger than that corresponding to the reference width, when the first beam is controlled to have a beam width larger than a reference width; and configuring the P to a value smaller than that corresponding to the reference width, when the first beam is controlled to have a beam width smaller than the reference width.

The generating of the N number of third data streams may include generating the N number of third data streams using data streams from (P/2−N/2+1)th second data stream to (P/2+N/2)th second data stream among the P number of second data streams.

The method may further include generating the P number of fifth data streams by precoding a fourth data stream for a second virtual antenna port based on a second precoding vector for the second virtual antenna port.

The generating of the N number of third data streams may include generating the N number of third data streams by multiple-channel adding each of the N number of second data streams among the P number of second data streams and each of the N number of fifth data streams among the P number of fifth data streams.

The generating of the P number of second data streams may include generating the first precoding vector so that the remaining elements, except for the N number of elements among elements of the first precoding vector become 0.

The generating of the P number of second data streams may include: generating a first shift sequence by circular shifting a first sequence having a constant magnitude by a first shift value in a time domain and a frequency domain; generating a second shift sequence by circular shifting a discrete Fourier transform (DFT) vector sequence by a second shift value; and generating the first precoding vector using the first shift sequence and the second shift sequence.

The generating of the P number of second data streams may further include adjusting at least one of the first shift value and the second shift value in order to control a phase of the first beam.

The mapping of the N number of third data streams may include turning the entire of the N number of physical antenna ports into a power-on state, regardless of a width of the first beam in order to form the first beam.

BRIEF DESCRIPTION OF THE DRAWINGS

FIG. 5 is a diagram illustrating an example of a virtual antenna mapping vector for mapping a virtual antenna to a physical antenna.

DETAILED DESCRIPTION OF THE EMBODIMENTS

Figure 1:
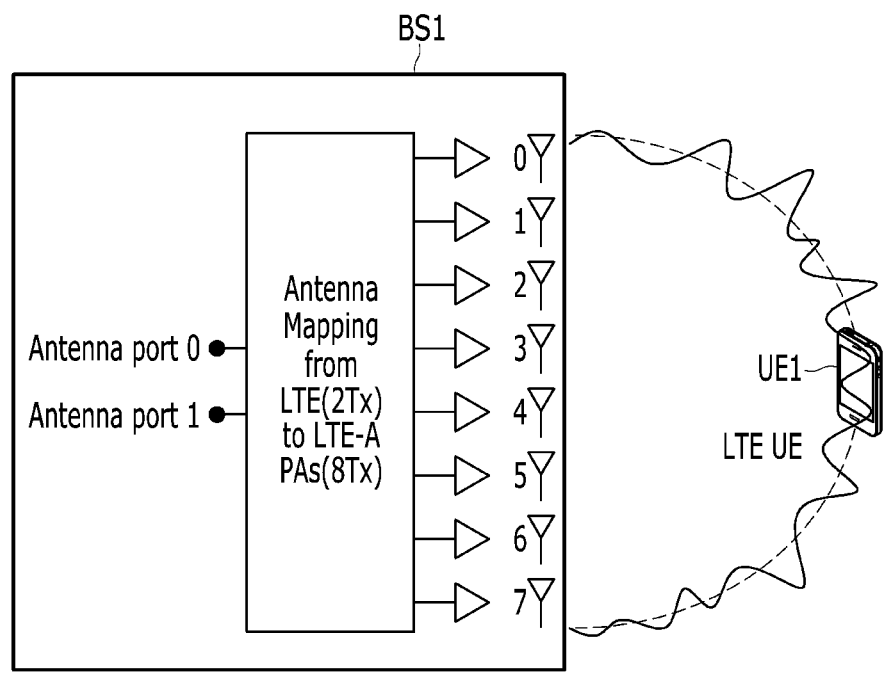
FIG. 1 is a diagram illustrating a method of mapping a virtual antenna to a physical antenna when the number of virtual antenna ports is 2.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In an entire specification, a terminal may indicate a mobile terminal (MT), a mobile station (MS), an advanced mobile station (AMS), a high reliability mobile station (HR-MS), a subscriber station (SS), a portable subscriber station, an access terminal (AT), an user equipment (UE), or the like, and may include an entire function or a partial function of the MT, the MS, the AMS, the HR-MS, the SS, the portable subscriber station, the AT, the UE, or the like.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a high reliability relay station (HR-RS) that performs a BS function, a repeater, a macro BS, a small BS, or the like, and may include an entire function or a partial function of the BS, the ABS, the HR-BS, the nodeB, the eNodeB, the AP, the RAS, the BTS, the MMR-BS, the RS, the HR-RS, the repeater, the macro BS, the small BS, or the like.

FIG. 1 is a diagram illustrating a method of mapping a virtual antenna to a physical antenna when the number of virtual antenna ports is 2.

Specifically, FIG. 1 illustrates a method of transmitting data for a terminal (i.e., terminal in which only maximum four antennas is recognized by a BS) of a Rel. 8 LTE specification when a BS of an LTE-A specification has 8 antennas. In FIG. 1, an LTE-A BS1 transmits transmitting data for a UE1 of a Rel. 8 LTE specification through two virtual antennas, but actually transmits transmitting data through 8 physical channels (8 physical antennas). The physical channel or the physical antenna has again a mapping relationship with a RF transceiver and an actual final transmitting antenna block, and in this specification and drawings, such a mapping relationship and a detailed description thereof are omitted.

FIG. 1 illustrates a case in which the BS1 has two virtual antenna ports (port 0, port 1). Two virtual antenna ports (port 0, port 1) are mapped to 8 physical antennas (0-7) to transmit data to the UE1. For example, the LTE-A BS1 may presently have maximum 8 physical antennas, but the UE1 of a Rel. 8 LTE specification may recognize only two or maximum four physical antennas of 8 physical antennas of the BS. Therefore, in order for the BS1 to provide a service to the UE1 of a Rel. 89 LTE specification, the BS1 requires a mapping function.

Figure 2:
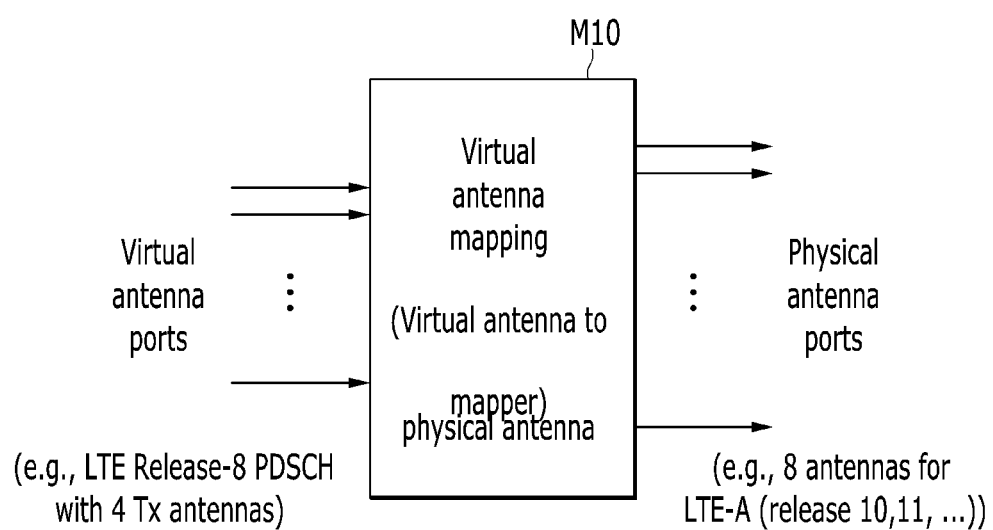
FIG. 2 is a diagram illustrating an antenna mapper for mapping a virtual antenna to a physical antenna.

FIG. 2 is a diagram illustrating an antenna mapper M10 for mapping a virtual antenna to a physical antenna.

The antenna mapper M10 has a function (hereinafter, 'virtual antenna mapping function') of mapping a virtual antenna port to a physical antenna port. As described above, an apparatus of an LTE-A specification may have 8 physical antennas, and an apparatus of a Rel. 8 LTE specification may have maximum four physical antennas.

A virtual antenna mapping function of the antenna mapper M10 should satisfy three requirements. A first requirement is that full power utilization should be performed in each physical antenna upon antenna virtualization. That is, upon multiple antenna setup, each power amplifier (PA) should be equally used (e.g., balanced input), and entire PAs should be worked at the same operating point and should provide uniform sector coverage.

A second requirement is that an antenna virtualization method (or virtual antenna mapping function) should be used so that a performance of physical channels, particularly, a physical downlink control channel (PDCCH) and a physical downlink shared channel (PDSCH) of a Rel. 8 LTE specification is not deteriorated.

A third requirement is that an antenna virtualization method (or virtual antenna mapping function/method) should be equally used regardless of whether antenna ports of a LTE-A are located at a radio resource block or a subframe.

A method of using only four antennas of 8 physical antennas and turning off other four antennas is an easiest method, but very inefficiently uses power. In order to efficiently use power, an antenna virtualization method should be used. Further, legacy terminals should perform channel estimation from four virtual antenna ports and should be able to measure values (e.g., channel quality indicator (CQI), precoding matrix indicator (PMI)) for link adaptation.

A transmission method based on virtual antenna mapping may be implemented with fixed precoding, cyclic delay diversity (CDD), and radio frequency (RF) switching, but up to now, the entire thereof does not satisfy the entire of the above-described three requirements. Particularly, a CDD technique that is defined in a present LTE specification has a concept similar to that of a precoding method, but in a CDD technique, reinforcement and extinction of a signal is repeated, and particularly, in a fading channel, by an extinction characteristic of a signal, a performance may be seriously degraded. Such performance degradation is verified in a reference document "Farooq Khan, LTE for 4G Mobile Broadband, Cambridge University Press, 2009, chapter six".

Hereinafter, an optimal antenna mapping method of satisfying the entire of the above-described three requirements will be described in detail. Hereinafter, for better comprehension and ease of description, particularly, a LTE-A system of 3GPP among orthogonal frequency division multiplexing (OFDM) transmission systems using an arrangement antenna is exemplified.

Figure 3:
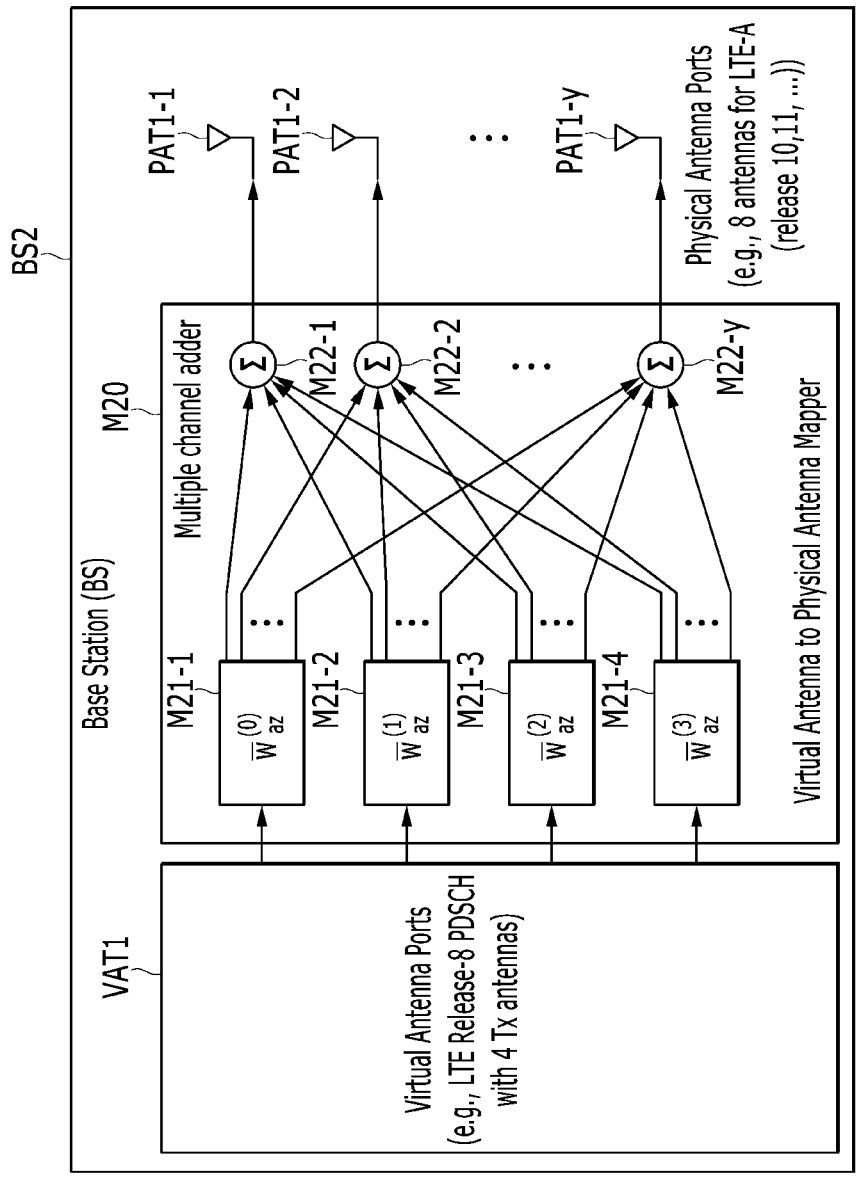
FIG. 3 is a diagram illustrating a method in which an apparatus including a 2D arrangement antenna maps a virtual antenna to a physical antenna according to an exemplary embodiment of the present invention.

FIG. 3 is a diagram illustrating a method in which an apparatus including a 2D arrangement antenna maps a virtual antenna to a physical antenna according to an exemplary embodiment of the present invention.

A BS2 includes a plurality of virtual antennas VAT1, an antenna mapper M20, and a plurality of physical antennas PAT1.

For better comprehension and ease of description, FIG. 3 illustrates a case in which the BS2 transmits data for a terminal of a Rel. 8 LTE specification through four virtual antenna ports. However, this is only an illustration and an exemplary embodiment of the present invention may be applied even to a case of mapping the different number of virtual antennas instead of 4 virtual antennas to a plurality of physical antennas.

Four data streams that are mapped to four virtual antenna ports VAT1, respectively, are input to the antenna mapper M20. The antenna mapper M20 includes a plurality of (e.g., 4) precoders M21 and a plurality of (e.g., 8) multiple channel adders M22.

Four precoders M21-1, M21-2, M21-3, and M21-4 precode four input data streams using virtual antenna mapping vectors (precoding vectors) $\overline{w}_{az}^{(0)}$, $\overline{w}_{az}^{(1)}$, $\overline{w}_{az}^{(2)}$, and $\overline{w}_{az}^{(3)}$ for virtual antenna ports VAT1. Specifically, the precoder M21-1 uses the virtual antenna mapping vector $\overline{w}_{az}^{(0)}$, the precoder M21-2 uses the virtual antenna mapping vector $\overline{w}_{az}^{(1)}$, the precoder M21-3 uses the virtual antenna mapping vector $\overline{w}_{az}^{(2)}$, and the precoder M21-4 uses the virtual antenna mapping vector $\overline{w}_{az}^{(3)}$. Hereinafter, the virtual antenna mapping vectors $\overline{w}_{az}^{(0)}$, $\overline{w}_{az}^{(1)}$, $\overline{w}_{az}^{(2)}$, and $\overline{w}_{az}^{(3)}$ will be described in detail. The respective precoders M21 generate data stream for antenna ports of the number corresponding to the physical channel number (e.g., 8). For example, the precoder M21-1 generates 8 data streams through the above-described precoding. Finally, data streams of the number corresponding to the physical channel number (e.g., 8) are generated at each virtual antenna port VAT1. In this specification, the number of physical channels is used as the same meaning as the number of physical antennas, but the physical antenna has again a mapping relationship with an actual final transmitting antenna. For example, when the number of virtual antennas is 4, the number of physical antennas is 8, and the number of actual final transmitting antennas is 16, four virtual antennas have a mapping relationship with 8 physical antennas, and 8 physical antennas have a mapping relationship with 16 actual final transmitting antennas. Data streams that are generated by the respective precoders M21 are input to the multiple channel adders M22 of the number corresponding to the physical antenna number (e.g., 8). For example, 8 data streams that are generated by the precoder M21-1 are input to 8 multiple channel adders M22-1, M22-2, ..., M22-$y$, respectively. Similarly, 8 data streams that are generated by the precoder M21-2 are input to 8 multiple channel adders M22-1, M22-2, ..., M22-$y$, respectively, 8 data streams that are generated by the precoder M21-3 are input to 8 multiple channel adders M22-1, M22-2, ..., M22-$y$, respectively, and 8 data streams that are generated by the precoder M21-4 are input to 8 multiple channel adders M22-1, M22-2, ..., M22-$y$, respectively.

The respective multiple channel adders M22 add four input data streams.

Data streams that are added by the respective multiple channel adders M22 are mapped and transmitted to the respective physical antennas (or physical antenna port) PAT1. For example, data streams that are added by the multiple channel adder M22-1 may be mapped and transmitted to a physical antenna PAT1-1 among 8 physical antennas PAT1-1, PAT1-2, ..., PAT1-$y$. A case in which the BS2 has 8 physical antennas is illustrated, but this is only an illustration. An exemplary embodiment of the present invention may be applied even to an apparatus having the different number of physical antennas instead of 8 physical antennas.

A method of generating virtual antenna mapping vectors (i.e., precoding vectors) $\overline{w}_{az}^{(0)}$, $\overline{w}_{az}^{(1)}$, $\overline{w}_{az}^{(2)}$, and $\overline{w}_{az}^{(3)}$ for the virtual antenna port VAT1 will be described in detail.

In order to generate a virtual antenna mapping vector, a time-domain constant amplitude (TCA)-a frequency-domain constant amplitude (FCA) sequence is used. The TCA-FCA sequence means a sequence in which a complex sequence having a constant magnitude in a time domain becomes a complex sequence having a constant magnitude even in a frequency domain through fast Fourier transform (FFT). Such a TCA-FCA sequence includes, for example, a constant amplitude zero auto-correlation (CAZAC) sequence (e.g., Zadoff-Chu sequence). Hereinafter, for better comprehension and ease of description, in order to describe an exemplary embodiment of the present invention, a case of using a Zadoff-Chu sequence as a TCA-FCA sequence is illustrated.

The Zadoff-Chu sequence may be generated, as in Equation 1.

$$ZC(0) \triangleq x_q(m) \qquad \text{[Equation 1]}$$
$$= e^{-j\frac{\pi qm(m+1)}{N_{ZC}}},$$
$$0 \leq m \leq N_{ZC} - 1$$

In Equation 1, $$x_q(m) = e^{-j\frac{\pi qm^2}{N_{ZC}}},$$
$$0 \leq m \leq N_{ZC} - 1.$$

In Equation 1, $x_q$ represents a Zadoff-Chu sequence of a q-th root, and $N_{ZC}$ represents a length of a Zadoff-Chu sequence. In Equation 1, $\alpha_0, \alpha_1, \ldots, \alpha N_{ZC}-1$ each represent an element of a TCA-FCA sequence (Zadoff-Chu sequence).

A discrete Fourier transform (DFT) matrix that is used for generating a virtual antenna mapping vector may be defined by Equation 2.

$$DFT(0) \triangleq [v]_{k,n} \qquad \text{[Equation 2]}$$
$$= e^{-j2\pi kn/N},$$
$$= [\overline{v}_0, \overline{v}_1, \ldots, \overline{v}_{N-1}],$$
$$k, n = 0, 1, \ldots, N-1$$

In Equation 2, N represents the element number of a DFT matrix, and $\overline{v}_0, \overline{v}_1, \ldots, \overline{v}_{N-1}$ each represent an element (beamforming vector) of the DFT matrix.

A matrix of a circular shift version in which column vectors of the DFT matrix are circular shifted by s may be defined by Equation 3.

$$DFT(s) \triangleq [\overline{v}_{-s}, \overline{v}_{-s+1}, \ldots, \overline{v}_0, \overline{v}_1, \overline{v}_2, \ldots, \overline{v}_{s-1}] \qquad \text{[Equation 3]}$$

When s=N/2, a matrix of a circular shift version is $$DFT(s=N/2) = [\overline{v}_{-N/2}, \overline{v}_{-N/2+1}, \ldots, \overline{v}_0, \overline{v}_1, \overline{v}_2, \ldots, \overline{v}_{N/2-1}]$$

Similarly, a sequence of a circular shift version in which a Zadoff-Chu sequence is circular shifted by t may be defined by Equation 4.

$$ZC(t) \triangleq [\alpha_{-t}, \alpha_{-t+1}, \ldots, \alpha_0, \alpha_1, \alpha_2, \ldots, \alpha_{t-1}] \qquad \text{[Equation 4]}$$

When $t=N_{ZC}/2$, a sequence of a circular shift version is $$ZC(t=N_{ZC}/2) = [\alpha_{-N_{ZC}/2}, \alpha_{-N_{ZC}/2+1}, \ldots, \alpha_0, \alpha_1, \alpha_2, \ldots, \alpha_{N_{ZC}/2-1}]$$

Here, it may be regarded that each of column vectors of the DFT matrix is a beamforming vector. Scalar values that are multiplied to each of column vectors may become an element of the Zadoff-Chu sequence. In other words, when the beamforming vector is $\overline{w}$, the beamforming vector $\overline{w}$ may be obtained by the scalar product of the Zadoff-Chu sequence to the DFT matrix. Specifically, the beamforming vector $\overline{w}$ may be defined by Equation 5.

$$\overline{w}(t,s) \triangleq ZC(t) \cdot DFT(s)^T \quad \text{[Equation 5]}$$
$$= [\alpha_{-t}, \alpha_{-t+1}, \ldots, \alpha_0, \alpha_1, \alpha_2, \ldots, \alpha_{t-1}] \cdot$$
$$[\overline{v}_{-s}, \overline{v}_{-s+1}, \ldots, \overline{v}_0, \overline{v}_1, \overline{v}_2, \ldots, \overline{v}_{s-1}]^T$$
$$= \alpha_{-t}\overline{v}_{-s} + \alpha_{-t+1}\overline{v}_{-s+1} + \ldots + \alpha_0\overline{v}_0 +$$
$$\alpha_1\overline{v}_1 + \alpha_2\overline{v}_2 + \ldots + \alpha_{t-1}\overline{v}_{s-1}$$

In Equation 5, $DFT(s)^T$ represents a transpose matrix of $DFT(s)$.

When $t=0$ and $s=0$, the beamforming vector $\overline{w}$ $$\overline{w}(t=0,s=0) \triangleq \alpha_0 \overline{v}_0 + \alpha_1 \overline{v}_1 + \ldots + \alpha_{N-1}\overline{v}_{N-1}$$

In order to intentionally form a shape of a beam to be formed, in Equation 5, some elements among elements of the Zadoff-Chu sequence may have a value of 0. For example, some coefficients $\alpha_0$, $\alpha_1$, and $\alpha_2$ of subordinate coefficients and a coefficient $\alpha_{N-1}$ of superordinate coefficients may have a value of 0.

t or s, which is a circular shift value that is applied to a vector sequence (e.g., DFT vector sequence) of a circular shift version or a scalar sequence (e.g., Zadoff-Chu sequence) of a circular shift version may be defined by Equations 6 and 7.

$$t_0=0, t_1=N/2, t_2=N/4, t_3=N/8, \quad \text{[Equation 6]}$$

$$s_0=0, s_1=N_{zc}/2, s_2=N_{zc}/4, s_3=N_{zc}/8, \quad \text{[Equation 7]}$$

When a virtual antenna mapping vector of a virtual antenna port p is $\overline{w}_{az}^{(p)}$, an antenna port of an Rel. 8 LTE specification is 0 to 3 and thus p=0, 1, 2, 3, and in FIG. 3, an output of a plurality of virtual antenna ports VAT1 becomes 4. Hereinafter, two methods (method MD10, method MD20) of generating $\overline{w}_{az}^{(p)}$ will be described in detail. Hereinafter, for better comprehension and ease of description, when the number of virtual antenna ports is 4 (p=0, 1, 2, 3), for example, a method MD10 and a method MD20 will be described.

The method MD10 is a method of generating a virtual antenna mapping vector for each of a second virtual antenna port (p=1), a third virtual antenna port (p=2), and a fourth virtual antenna port (p=3) by circular shifting a virtual antenna mapping vector for a first virtual antenna port (p=0) of four virtual antenna ports.

Specifically, a virtual antenna mapping vector for a first virtual antenna port (p=0) of four virtual antenna ports may be defined by Equation 8.

$$\overline{w}_{az}^{(0)} = \overline{w}(t_i, s_j) = ZC(t_i) \cdot DFT(s_j)^T, i \in \{0,1,\ldots\},$$
$$j \in \{0,1,\ldots\} \quad \text{[Equation 8]}$$

When $\overline{w}_{az}^{(0)}(u)$ is defined to a vector of a circular shift version in which a vector element is circular shifted by u from an original vector $\overline{w}_{az}^{(0)}$, $\overline{w}_{az}^{(0)} = \overline{w}_{az}^{(0)}(0)$, virtual antenna mapping vectors for the second, third, and fourth virtual antenna ports may be generated as follows. A virtual antenna mapping vector for the second virtual antenna port is $\overline{w}_{az}^{(1)} = \overline{w}_{az}^{(0)}(u_{k1})$, a virtual antenna mapping vector for the third virtual antenna port is $\overline{w}_{az}^{(2)} = \overline{w}_{az}^{(0)}(u_{k2})$, and a virtual antenna mapping vector for the third virtual antenna port is $\overline{w}_{az}^{(3)} = \overline{w}_{az}^{(0)}(u_{k3})$. Here, k1, k2, k3 ∈ {1, 2, ...} and k1≠k2≠k3≠0. For example, k0=0, k1=$N_w$/2, k2=$N_w$/4, k3=$N_w$/8, ..., where $N_w$ is the element number (cycle) of a virtual antenna mapping vector. In other words, virtual antenna mapping vectors for the second, third, and fourth virtual antenna ports are a vector of a circular shift version in which a virtual antenna mapping vector for the first virtual antenna port is circular shifted by the random element number.

The method MD20 is a method of randomly combining random circular shift versions of the DFT vector sequence and random circular shift versions of the Zadoff-Chu sequence and generating a virtual antenna mapping vector for each virtual antenna port (p=0, 1, 2, 3) using the combined versions.

In the method MD20, a virtual antenna mapping vector for each virtual antenna port may be generated by Equation 9.

$$\overline{w}_{az}^{(0)} = \overline{w}(t_{i4}, s_{j4}) = ZC(t_{i4}) \cdot DFT(s_{j4})^T$$

$$\overline{w}_{az}^{(1)} = \overline{w}(t_{i1}, s_{j1}) = ZC(t_{i1}) \cdot DFT(s_{j1})^T$$

$$\overline{w}_{az}^{(2)} = \overline{w}(t_{i2}, s_{j2}) = ZC(t_{i2}) \cdot DFT(s_{j2})^T$$

$$\overline{w}_{az}^{(3)} = \overline{w}(t_{i3}, s_{j3}) = ZC(t_{i3}) \cdot DFT(s_{j3})^T \quad \text{[Equation 9]}$$

In Equation 9, i1, i2, i3, i4 ∈ {0, 1, 2, ...} and i1≠i2≠i3≠i4. Similarly, in Equation 9, j1, j2, j3, j4 ∈ {0, 1, 2, ...} and j1≠j2≠j3≠j4.

In other words, a virtual antenna mapping vector for each virtual antenna port is generated by a combination of a Zadoff-Chu sequence $ZC(t_i)$ of a random circular shift version and a DFT matrix $DFT(s_j)$ of a random circular shift version. Here, the DFT matrix $DFT(s_j)$ of the circular shift version means a DFT matrix or a vector sequence (column vector sequence or row vector sequence) of a circular shift version in which each column vector (or row vector) of the DFT matrix is circular shifted by a random value. For example, in Equation 9, the virtual antenna mapping vector $\overline{w}_{az}^{(0)}$ may be obtained by the scalar product of a Zadoff-Chu sequence ZC ($t_{i4}$) in which the Zadoff-Chu sequence is circular shifted by $t_{i4}$ and a DFT matrix DFT ($s_{j4}$) in which a DFT matrix is circular shifted by $s_{j4}$.

In the foregoing description, in order to describe an exemplary embodiment of the present invention, an apparatus including a 2D arrangement physical antenna has been exemplified. Further, an exemplary embodiment of the present invention that is applied to an apparatus including a 3D arrangement physical antenna will be described in detail with reference to FIG. 4. When a physical antenna is a 3D arrangement antenna, a method of mapping a virtual antenna that is applied to the above-described 2D arrangement antenna may be applied to the 3D arrangement antenna.

Figure 4:
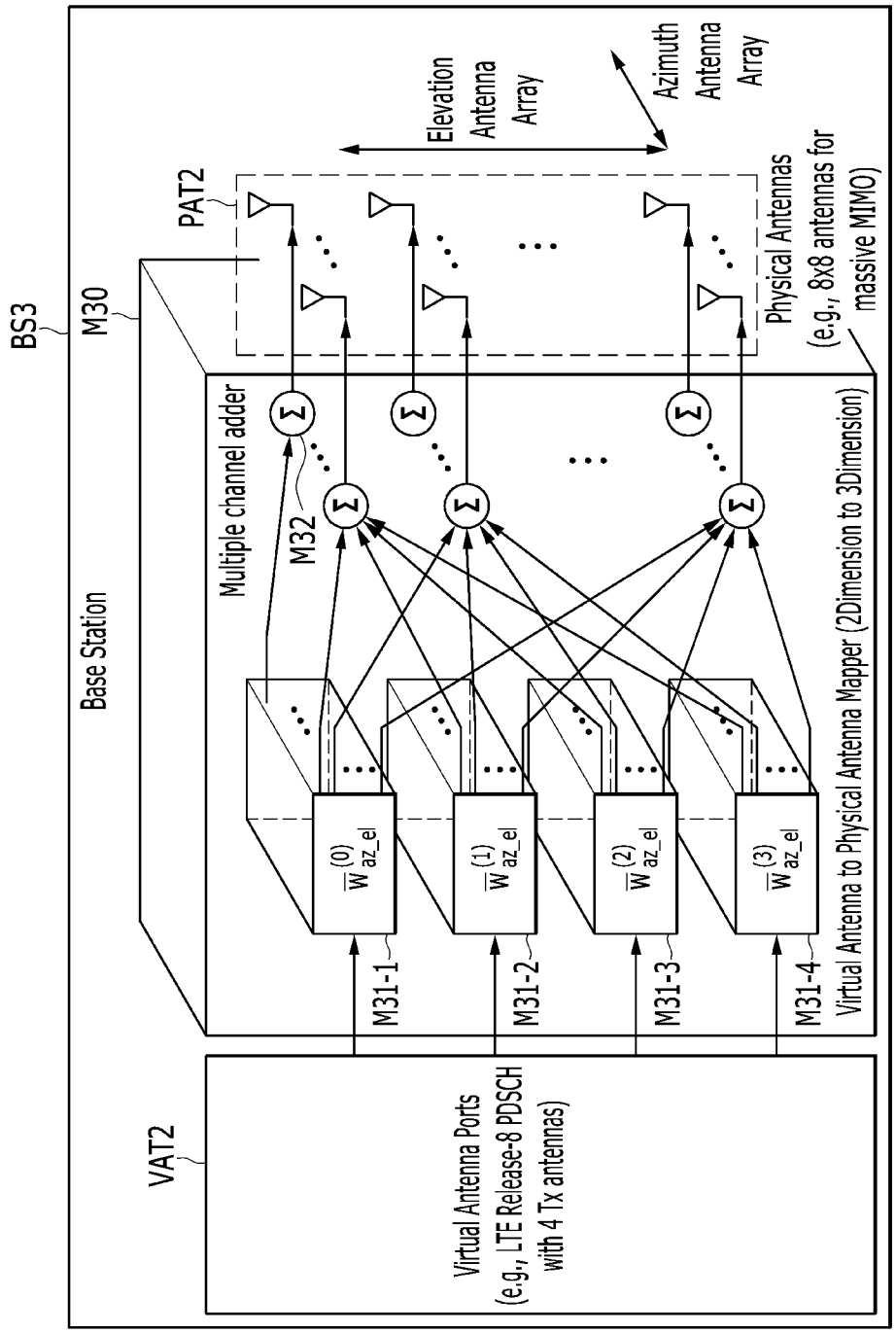
FIG. 4 is a diagram illustrating a method in which an apparatus including a 3D arrangement antenna maps a virtual antenna to a physical antenna according to an exemplary embodiment of the present invention.

FIG. 4 is a diagram illustrating a method in which an apparatus including a 3D arrangement antenna maps a virtual antenna to a physical antenna according to an exemplary embodiment of the present invention. For better comprehension and ease of description, FIG. 4 illustrates a case in which a BS3 transmits data for a terminal of a Rel. 8 LTE specification through four virtual antenna ports. However, this is only an illustration, and an exemplary embodiment of the present invention may be applied even to a case of mapping the different number of virtual antennas instead of four virtual antennas to a plurality of physical antennas.

The BS3 includes a plurality of (e.g., 4) virtual antennas VAT2, an antenna mapper M30, and a 3D arrangement physical antenna PAT2. For better comprehension and ease of description, in order to describe an exemplary embodiment of the present invention, a case in which a 3D arrangement physical antenna PAT2 is 8×8 antennas for a massive multiple input multiple output (MIMO) is exemplified. However, this is only an illustration and an exemplary embodiment of the present invention may be applied even to an apparatus having other arrangement physical antennas instead of 8×8 antennas.

Four data streams that are output from four virtual antenna ports VAT2 are input to the antenna mapper M30. The antenna mapper M30 includes a plurality of (e.g., 4) precoders M31 and a plurality of (e.g., 64) multiple channel adders M32.

Four precoders M31-1, M31-2, M31-3, and M31-4 precode input data stream using virtual antenna mapping matrixes $\overline{w}_{az\_el}^{(0)}$, $\overline{w}_{az\_el}^{(1)}$, $\overline{w}_{az\_el}^{(2)}$, and $\overline{w}_{az\_el}^{(3)}$, respectively, for a virtual antenna port VAT2. The respective precoders M31 generate data streams of the number corresponding to the number (e.g., 8×8) of physical antennas. That is, the respective precoders M31 generate data streams of the number corresponding to the product (e.g., 64) of the number (e.g., 8) of elevation arrangement antennas and the number (e.g., 8) of azimuth arrangement antennas. For example, the precoder M31-1 generates 64 data streams through the above-described precoding.

Data streams that are generated by the respective precoders M31 are input to multiple channel adders M32 of the number corresponding to the physical antenna number (e.g., 64). For example, 64 data streams that are generated by a precoder M31-1 are input to 64 multiple channel adders M32, respectively. Similarly, 64 data streams that are generated by a precoder M31-2 are input to 64 multiple channel adders M32, respectively, 64 data streams that are generated by a precoder M31-3 are input to 64 multiple channel adders M32, respectively, and 64 data streams that are generated by a precoder M31-4 are input to 64 multiple channel adders M32, respectively.

The respective multiple channel adders M32 add four input data streams.

Data streams that are added by the respective multiple channel adders M32 are mapped and transmitted to antennas, respectively, belonging to the 3D arrangement physical antenna PAT2. Specifically, outputs of 8×8 multiple channel adders M32 are mapped to 8×8 antennas PAT2, respectively.

A method of generating virtual antenna mapping matrixes $\overline{w}_{az\_el}^{(0)}$, $\overline{w}_{az\_el}^{(1)}$, $\overline{w}_{az\_el}^{(2)}$, and $\overline{w}_{az\_el}^{(3)}$ that are applied to the above-described 3D arrangement physical antenna will be described in detail.

Because a virtual antenna mapping matrix (or beamforming arrangement) that is applied to the 3D arrangement physical antenna is the product of an elevation beamforming coefficient and an azimuth beamforming coefficient, the virtual antenna mapping matrix may be represented by Equations 10, 11, and 12.

$$A_{BT} \triangleq \overline{w}_{el}\overline{w}_{az}^T = \begin{bmatrix} A_{00} & \cdots & A_{0(N-1)} \\ A_{10} & \cdots & A_1(N-1) \\ \vdots & \ddots & \vdots \\ A_{(M-1)0} & \cdots & A_{(M-1)(N-1)} \end{bmatrix}$$ [Equation 10]

$$A_{BT} \triangleq$$ [Equation 11]

$$\overline{w}_{el}\overline{w}_{az}^T = \begin{bmatrix} w_{el}(0)w_{az}(0) & \cdots & w_{el}(0)w_{az}(N-1) \\ w_{el}(1)w_{az}(0) & \cdots & w_{el}(1)w_{az}(N-1) \\ \vdots & \ddots & \vdots \\ w_{el}(M-1)w_{az}(0) & \cdots & w_{el}(M-1)w_{az}(N-1) \end{bmatrix}$$

$$A_{BT} \triangleq \overline{w}_{el}\overline{w}_{az}^T = \begin{bmatrix} w_{el}(0) \\ \vdots \\ w_{el}(M-1) \end{bmatrix} [w_{az}(0) \ \cdots \ w_{az}(N-1)]$$ [Equation 12]

In Equations 10 to 12, $A_{BT}$ represents a virtual antenna mapping matrix (or beamforming arrangement) that is applied to the 3D arrangement physical antenna, $\overline{w}_{el}$ represents an elevation beamforming coefficient vector (M×1), $\overline{w}_{az}$ represents an azimuth beamforming coefficient vector (N×1), and $\overline{w}_{az}^T$ represents a transpose vector (1×N) of $\overline{w}_{az}$. In Equations 11 and 12, $w_{el}(\ )$ represents an elevation beamforming coefficient, $w_{az}(\ )$ represents an azimuth beamforming coefficient, M represents the number of $w_{el}(\ )$, and N represents the number of $w_{az}(\ )$.

The virtual antenna mapping matrixes $\overline{w}_{az\_el}^{(0)}$, $\overline{w}_{az\_el}^{(1)}$, $\overline{w}_{az\_el}^{(2)}$, and $\overline{w}_{az\_el}^{(3)}$ may be generated using a method similar to the above-described method MD10 or method MD20.

FIG. 5 is a diagram illustrating an example of a virtual antenna mapping vector for mapping a virtual antenna to a physical antenna. In FIG. 5, it is assumed that the number of the virtual antenna ports is 2 and the number of physical antennas is 8.

In FIG. 5, a virtual antenna mapping vector $w^{(1)}$ for a first virtual antenna port of two virtual antenna ports corresponds to a beam signal (beam0) of two beam signal (beam0 and beam1), and a virtual antenna mapping vector $w^{(2)}$ for a second virtual antenna port corresponds to a beam signal (beam1) of two beam signals (beam0 and beam1).

Figure 6:
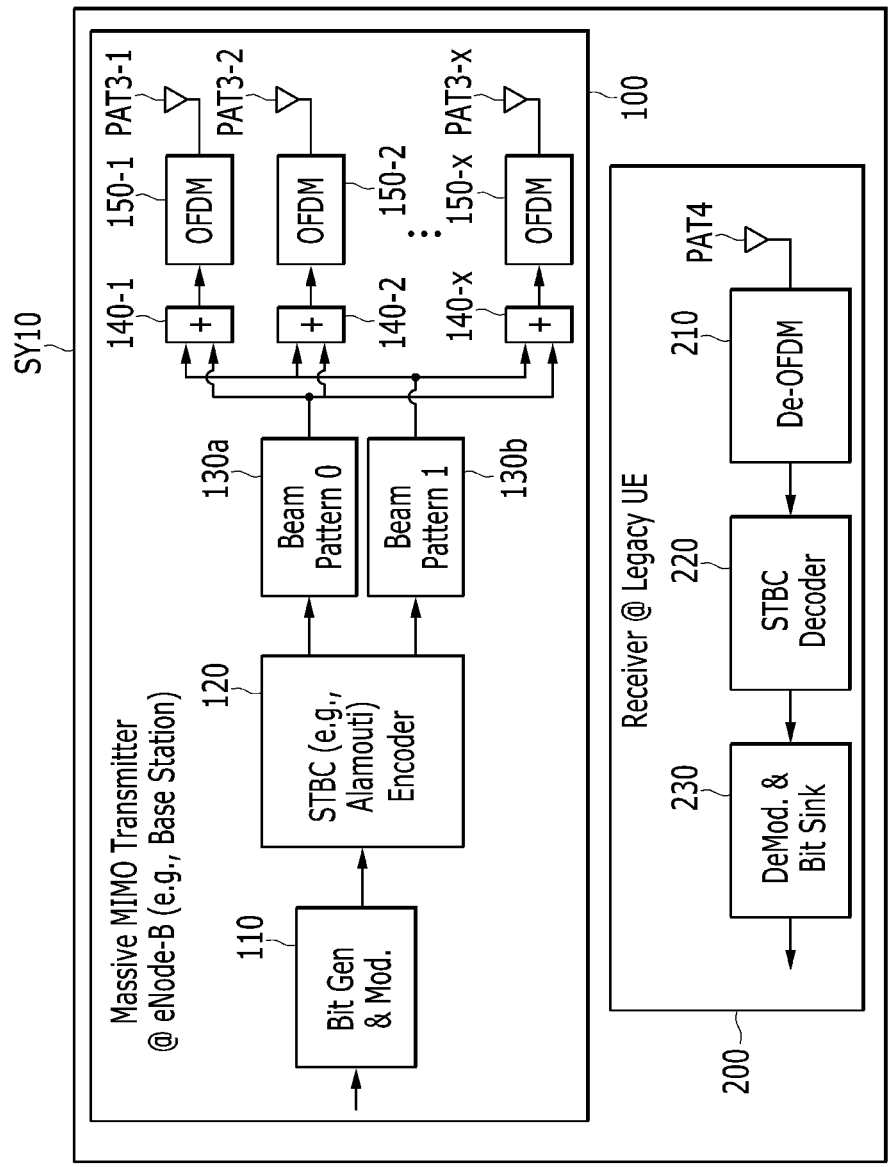
FIG. 6 is a block diagram illustrating a transmitting and receiving system to which a space-time block code is applied according to an exemplary embodiment of the present invention.

FIG. 6 is a block diagram illustrating a transmitting and receiving system to which a space-time block code (STBC) is applied according to an exemplary embodiment of the present invention. Specifically, FIG. 6 illustrates an STBC (e.g., Alamouti code) transmitting and receiving system SY10 using a virtual antenna mapping vector according to an exemplary embodiment of the present invention.

The transmitting and receiving system SY10 includes a massive MIMO transmitter 100 of the BS and a receiver 200 of a terminal (e.g., a terminal of Rel. 8 LTE specification).

The massive MIMO transmitter 100 includes a bit generator & modulator 110, an STBC encoder 120, a plurality of beam pattern generators 130a and 130b, a plurality of adders 140-1, 140-2, . . . , 140-x, a plurality of OFDM modulators 150-1, 150-2, . . . , 150-x, and a plurality of physical antennas PAT3-1, PAT3-2, . . . , PAT3-x. FIG. 6 illustrates a case in which the massive MIMO transmitter 100 includes two beam pattern generators 130a and 130b.

The beam pattern generators 130a and 130b may perform the same function as or a function similar to a virtual antenna mapping function of the above-described antenna mapper (e.g., M20, M30).

The receiver 200 includes a physical antenna PAT4, an OFDM demodulator 210, an STBC decoder 220, and a demodulation & bit sinc unit 230.

Figure 7:
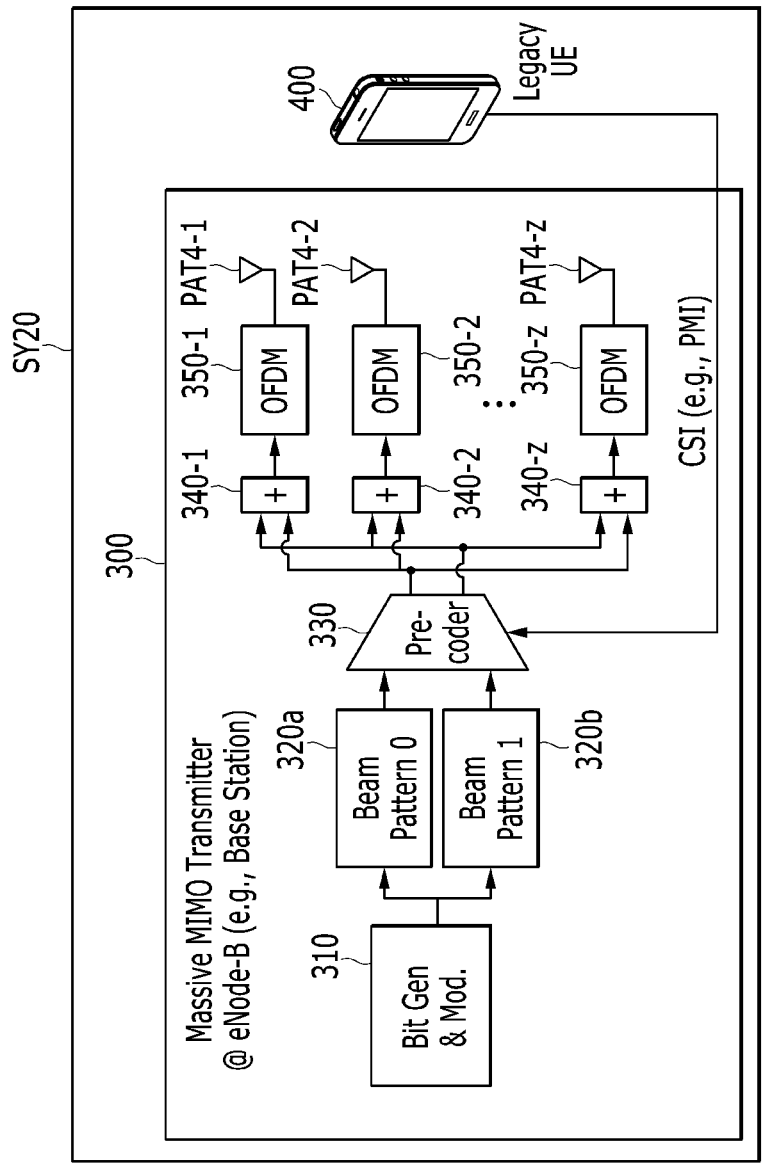
FIG. 7 is a block diagram illustrating a transmitting and receiving system to which a precoding codebook of an LTE specification is applied according to an exemplary embodiment of the present invention.

FIG. 7 is a block diagram illustrating a transmitting and receiving system to which a precoding codebook of an LTE specification is applied according to an exemplary embodiment of the present invention. Specifically, FIG. 7 illustrates a transmitting and receiving system SY20 that uses a virtual antenna mapping vector and to which a precoding codebook of an LTE specification is applied according to an exemplary embodiment of the present invention.

The transmitting and receiving system SY20 includes a massive MIMO transmitter 300 and a terminal (e.g., a terminal 400 of a Rel. 8 LTE specification) of the BS.

The massive MIMO transmitter 300 includes a bit generator & modulator 310, a plurality of beam pattern generators 320a and 320b, a precoder 330, a plurality of adders 340-1, 340-2, . . . , 340-z, a plurality of OFDM modulators 350-1, 350-2, . . . , 350-z, and a plurality of physical antennas PAT4-1, PAT4-2, . . . , PAT4-z. FIG. 7 illustrates a case in which the massive MIMO transmitter 300 includes two beam pattern generators 320a and 320b.

The beam pattern generators 320a and 320b may perform the same function as or a function similar to a virtual antenna mapping function of the above-described antenna mapper (e.g., M20, M30).

The precoder 330 determines at least one of precoding vectors (or precoding matrix) of a codebook based on channel state information (CSI) (e.g., PMI) that is fed back from a terminal corresponding to each beam signal and applies the determined precoding vector (or precoding matrix) to each beam signal.

A receiver of the terminal 400 may be formed in the same form as or a form similar to the receiver 200 of FIG. 6.

In the foregoing description, an omnidirectional beamforming method has been described. Hereinafter, a method of controlling a beam width will be described.

A wireless local area networks (WLANs) standard specification (e.g., IEEE 802.11 ad and IEEE 802.15. 3c), i.e., millimeter wave WLAN specifications presently using 60 GHz represent to form a beam using arrangement antennas, to receive the control of medium access control (MAC), and to adjust and use a beam width. This will be described with reference to FIG. 8.

Figure 8:
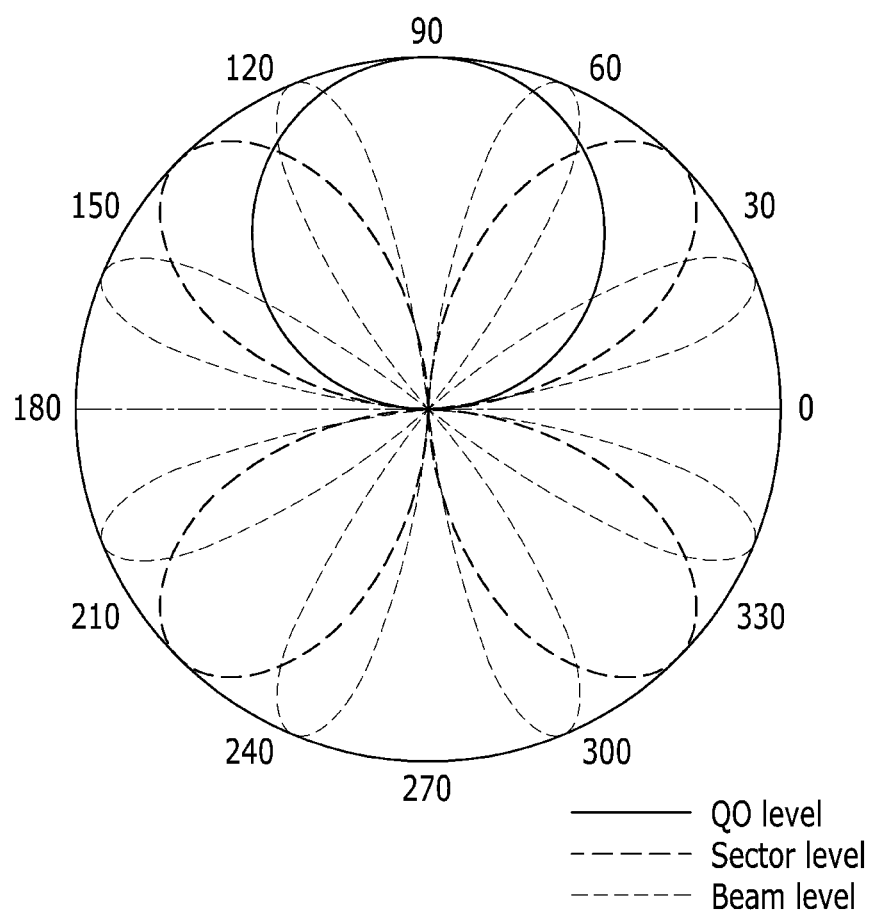
FIG. 8 is a diagram illustrating different beam width kinds that are defined to a millimeter wireless local area network (WLAN) specification IEEE 802.11 ad.

FIG. 8 is a diagram illustrating different beam width kinds that are defined to a millimeter WLAN specification 802.11 ad. Specifically, FIG. 8 is a diagram that is cited from a reference document "Chandra, K., Prasad, R. V., Niemegeers, I. G., & Biswas, A. R. (2014, January). Adaptive beamwidth selection for contention based access periods in millimeter wave wlans. In Consumer Communications and Networking Conference (CCNC), 2014 IEEE 11th (pp. 458-464)".

As illustrated in FIG. 8, millimeter WLAN specification 802.11ad represents to track a location of a terminal or to perform the control using different beam widths such as Quasi-Omnidirectional (QO) level beamforming, sector level beamforming, and beam level beamforming. In this case, a common beam width control is performed with the following method.

That is, a beam width is inversely proportional to the antenna number. That is, as the number of turned-on (powered-on) antennas increases, a sharp beam having a small beam width is formed, and as the number of antennas participating in beamforming decreases, a broad beam having a large beam width is formed. Therefore, in a method of controlling a general beam width, by turning off power of some antennas among an entire arrangement antenna, a beam width is increased, and in order to again form a sharp beam, power of an entire antenna is turned on. However, such a method has the following serious problem.

In order to form a broad beam, only some antennas among antennas of a transmitter (e.g., an access point of the BS or the WLAN) are used. In this case, because total transmission power of the transmitter becomes the sum of respective antenna transmission power, transmission power of one antenna relatively increases. Because a price of an antenna and an RF circuit, particularly, a power amplifier (PA) increases in proportional to a magnitude of transmission power, an RF antenna circuit using a low power amplifier is advantageous. Therefore, even if a beam width is large, a transmission method of turning on power of an entire antenna is required. For this reason, according to an exemplary embodiment of the present invention, a method of enabling an entire antenna to always participate in beamforming regardless of whether a beam width is sharp or broad is provided.

Before describing such a method according to an exemplary embodiment of the present invention, a principle of beamforming to be a basic principle and a correlation of Fourier transform and a box function (or a rectangular function), and a sinc function will be first described.

First, in a beamforming principle, each antenna signal may be approximated through discrete time Fourier transform (DTFT) similar to a DTFT procedure, and a reference thereof has been described in a reference document "X. Yang, W. Jiang and B. Vucetic, A random beamforming technique for omnidirectional coverage in multiple-antenna systems, IEEE Trans. Veh. Tech., vol. 62, no. 3, pp. 1420-1425, March 2013".

Figure 9:
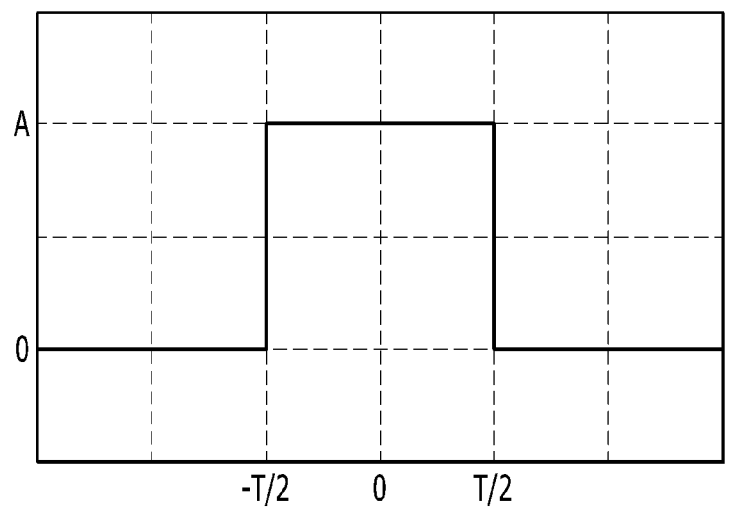
FIG. 9 is a graph illustrating a box function.

Further, as in the following description, Fourier transform of a box function becomes a sinc function and vice versa. This is referred to as duality. In order to describe in detail, a box function (or rect. Function) means a square pulse, as illustrated in FIG. 9. FIG. 9 illustrates a box function.

In FIG. 9, a function g(t) has an amplitude value A and represents a signal of a cycle $t=-T/2$ to $t=T/2$. That is, at a segment $|t|>T/2$, $g(t)=0$. Such a box function is represented with $\text{rect}_T(t)$. That is, $$g(t) = \text{rect}_T(t).$$

By a Fourier transform definition, Equation 13 is obtained.

$$\mathcal{F}\{g(t)\} = G(f) = \int_{-\infty}^{\infty} g(t) e^{-2\pi i f t} \, dt \quad \text{[Equation 13]}$$

$$= \int_{-T/2}^{T/2} A e^{-2\pi i f t} \, dt = \frac{A}{-2\pi i f} [e^{-2\pi i f t} \big|_{-T/2}^{T/2}]$$

$$= \frac{A}{-2\pi i f} [e^{-\pi i T} - e^{\pi i f T}] = \frac{AT}{\pi f T} \left[ \frac{e^{-\pi i T} - e^{\pi i f T}}{2i} \right]$$

$$= \frac{AT}{\pi f T} \sin(\pi f T) = AT[\text{sinc}(fT)]$$

Here, when a final result is represented with G(f), this becomes a sinc function and is defined by Equation 14.

$$\text{sinc}(t) = \frac{\sin(\pi t)}{\pi t} \quad \text{[Equation 14]}$$

Figure 10:
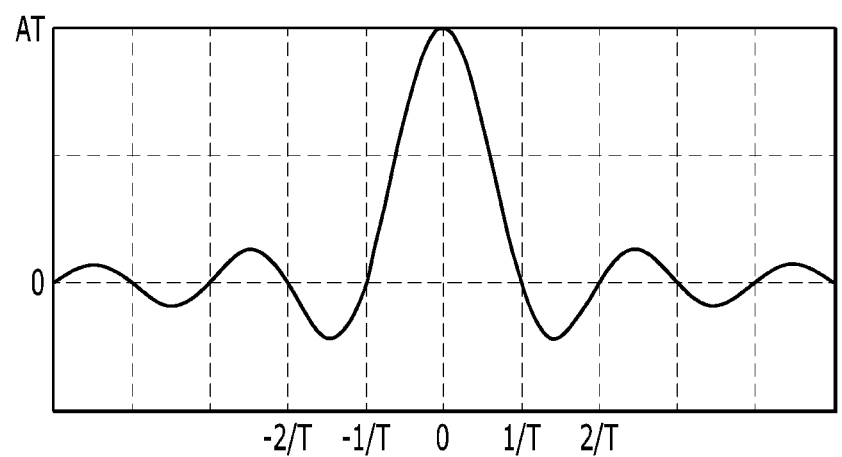
FIG. 10 is a graph illustrating a sinc function (Fourier transform result of a box function).

In other words, Fourier transform G(f) of g(t) is illustrated in FIG. 10. FIG. 10 illustrates a sinc function (Fourier transform result of a box function).

Figure 11:
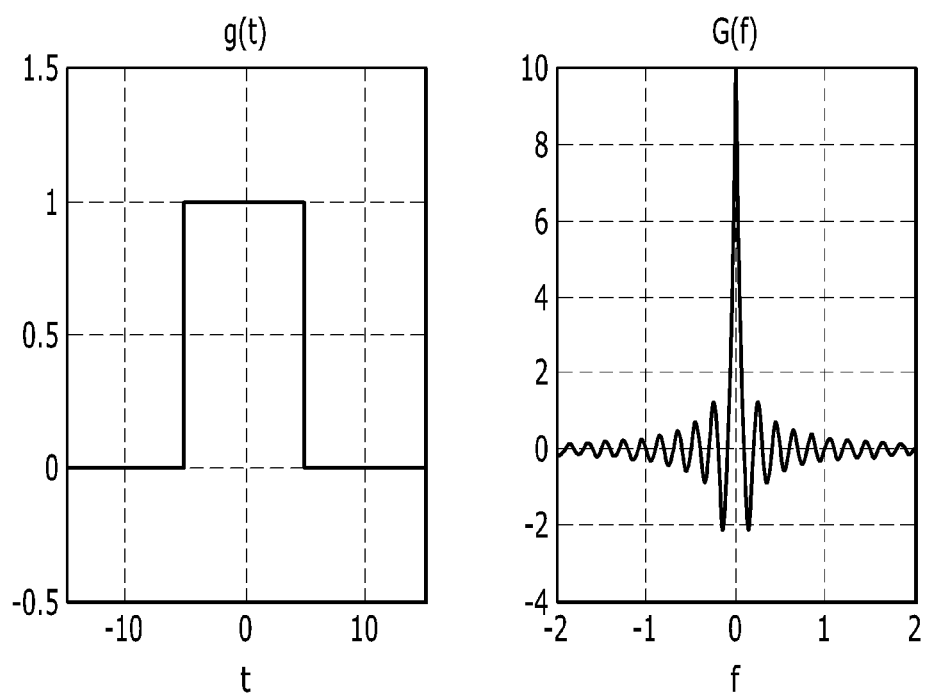
FIG. 11 is a graph illustrating a box function and a sinc function before convolution.

FIG. 11 illustrates a box function g(t) and a sinc function G(f) before convolution.

A convolution result between a Dirac delta function and a random function generally becomes a random function. Therefore, a convolution result between a Dirac delta function and a synchronization function becomes a sinc function. However, when a box function and a synchronization function instead of a Dirac delta function are convoluted, a delta function having a wide width is formed in proportional to a duty duration of the box function. This is illustrated in FIG. 12.

Figure 12:
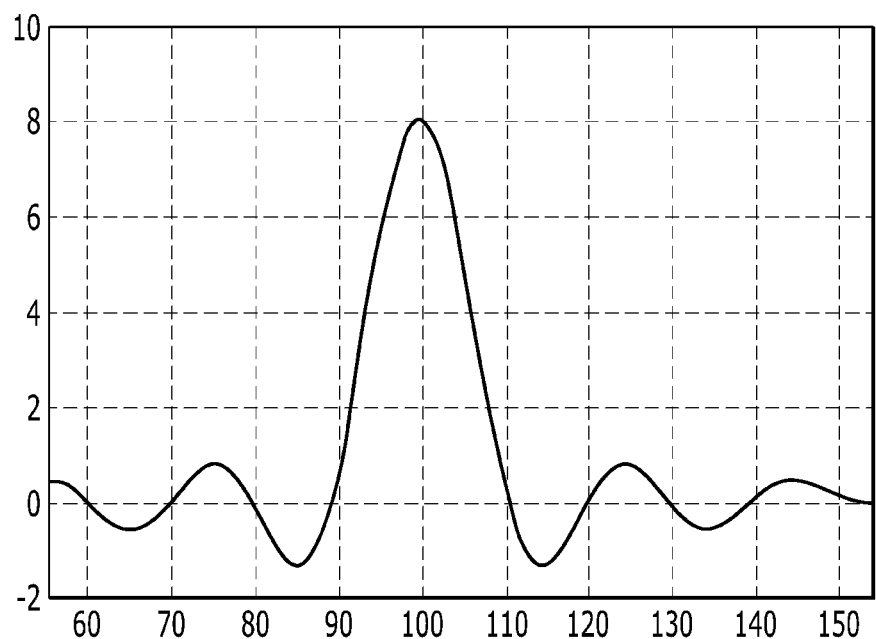
FIG. 12 is a graph illustrating a convolution result between a box function and a sinc function.

FIG. 12 illustrates a convolution result between a box function and a sinc function.

In a method according to an exemplary embodiment of the present invention, an arrangement antenna system having a pseudo antenna element is assumed, and a box function is formed and then a coefficient, i.e., a value, except for 0, corresponding to a duty duration of the box function is mapped to an actual physical antenna. An example of such a method may be represented with the following pseudo code (e.g., matlab™ code). It is assumed that the following pseudo code generates a precoding vector (or virtual antenna mapping vector) for one beam (or one virtual antenna port). Even when generating a plurality of precoding vectors for a plurality of beams, a method (e.g., circular shift value (parameter sh) change) similar to a method that is described in the following pseudo code may be applied.

Precoding vector values that are finally mapped to a physical antenna become values, except for 0 among w, which is an execution result of the following pseudo code, and such values, except for 0 are mapped to respective antennas. The same method as or a method similar to the above-described method MD10 or method MD20 may be applied to a beam width control method according to an exemplary embodiment of the present invention. An antenna mapper (e.g., M20, M30) may be implemented to additionally perform a beam width control function according to an exemplary embodiment of the present invention. In the following pseudo code, the element number of a virtual antenna mapping vector is Ne.

```
Ne=100; % Number of pseudo antenna elements
Nr=64; % Number of actual antenna elements
u=1; sh=2; jj=sqrt -1; % Zadoff-Chu parameters
theta0=0*pi/180.0;
fc=3.5e9; c=3e8; lambda=c/fc;
d=0.5*lambda; k=2*pi/lambda;
az=-180:0.5:180;
az=az*pi/180;
n=0:Ne-1;
W_mat=zeros(Ne,Ne);
index=1;
form=-Ne/2:Ne/2-1,
nt=(0:Ne-1)';
W_mat(:,index)=exp (jj*2*pi/Ne*m*nt);
index=index+1;
end
seq=exp(-jj*pi*u*n.* n+0/Ne); % CAZAC seq.
% Circul shifting
tmp = circshift(seq.', sh);
sseq = tmp.';
tmp = circshift(W_mat.',0);
sW_mat = tmp.';
for i=1:Ne,
tW_mat(:,i)=sseq(i)*sW_mat(:,i);
end
uw = sum(tW_mat (:,1:Ne).'); w = uw./ Ne;
t = w.'; w=t;
t0 = Ne/2 - Nr/2;
t1= Ne - t0 + 1;
w 1:t0 = 0;
w (t1:Ne) = 0;
% Choose not zero elements in w for ant. map
```

Figure 13A:
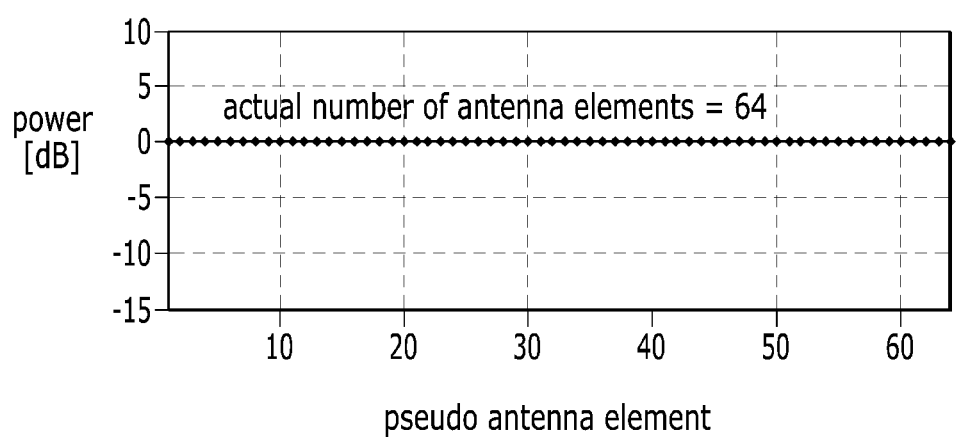
FIGS. 13A and 13B are graphs illustrating an omnidirectional beam that is formed using 64 arrangement antennas.
Figure 13B:
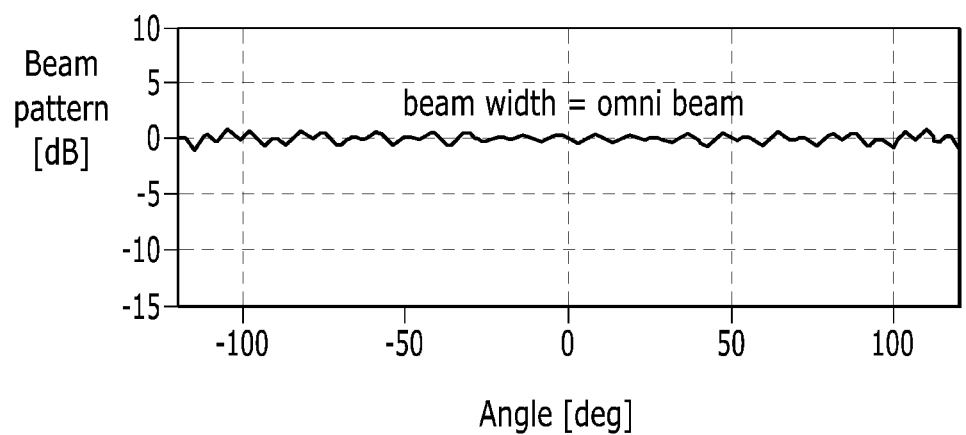

In the above-described example, it is assumed that the number of actual physical antennas is 64, when the entire of 64 antennas is covered through a box function, as illustrated in FIGS. 13A and 13B, an omnidirectional beam is generated.

FIGS. 13A and 13B illustrate an omnidirectional beam that is formed using 64 arrangement antennas.

Figure 14A:
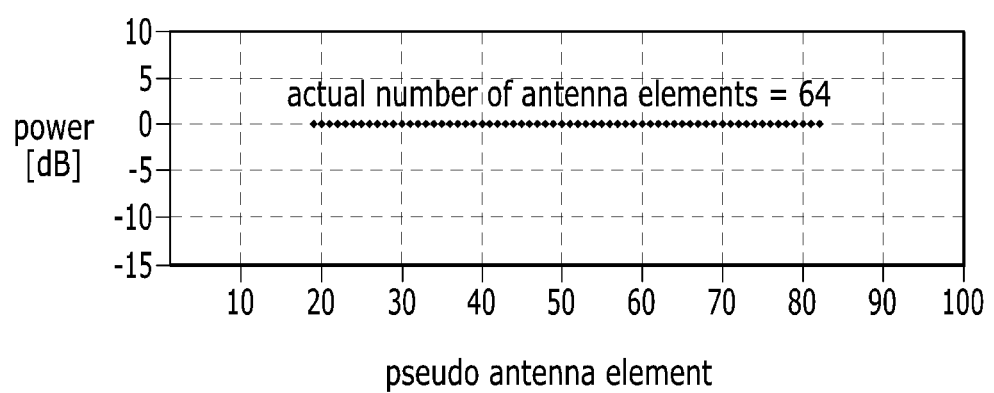
FIGS. 14A and 14B are graphs illustrating a beam that is formed using 64 arrangement antenna and that has a beam width of 90°.
Figure 14B:
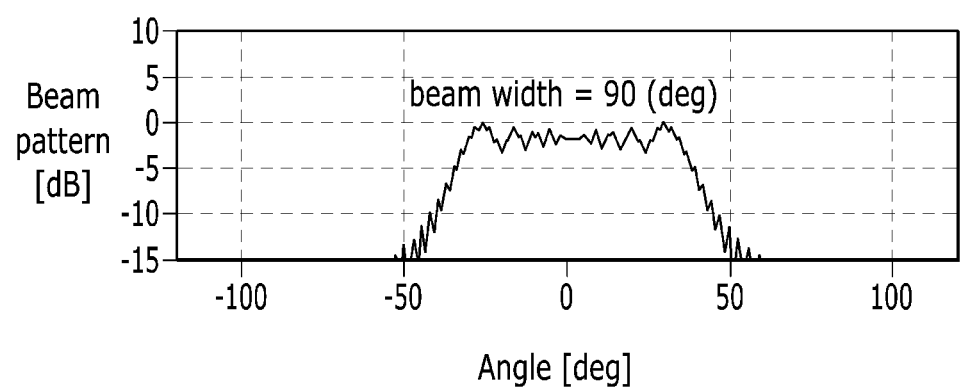

FIGS. 14A and 14B illustrate a simulation result in which a beam width becomes 90° (FIG. 14B) in a condition (FIG. 14A) in which the entire of given physical antennas transmits the same power when it is assumed that the number of actual physical antennas is 64. Specifically, FIGS. 14A and 14B illustrate a beam that is formed using 64 arrangement antennas and that has a beam width of 90°.

Figure 15A:
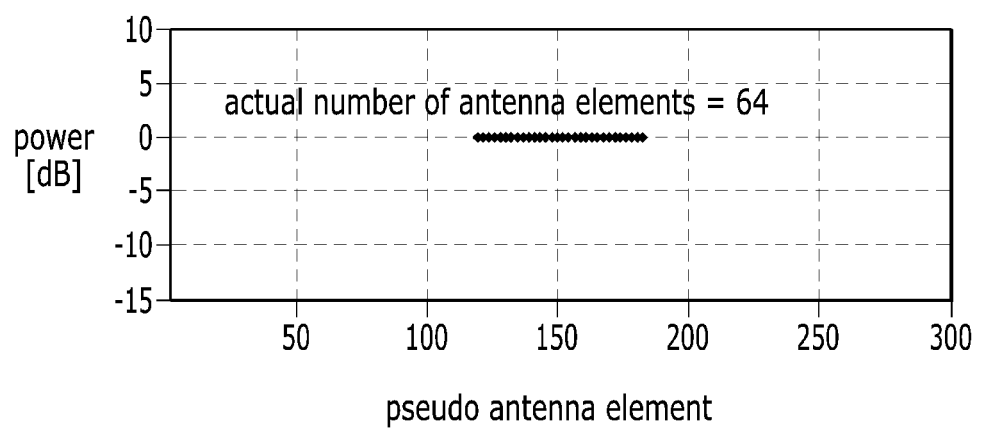
FIGS. 15A and 15B are graphs illustrating a beam that is formed using 64 arrangement antenna and that has a beam width of 40°.
Figure 15B:
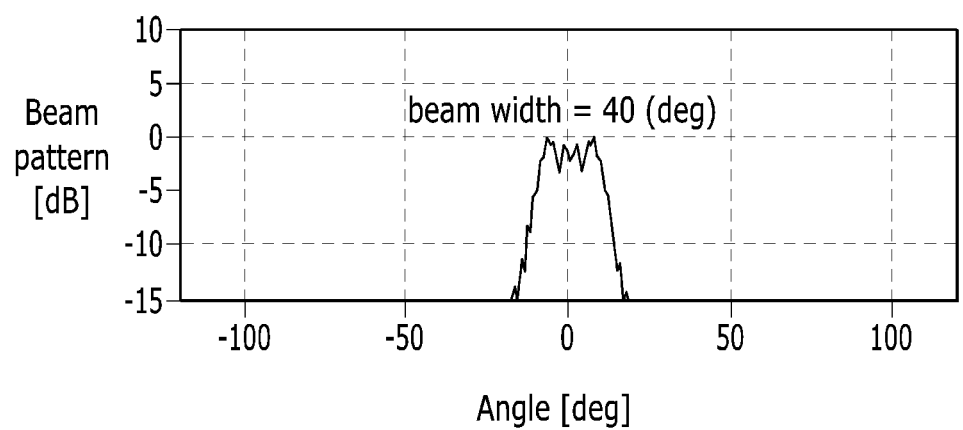

FIGS. 15A and 15B illustrate a simulation result in which a beam width becomes 40° (FIG. 15B) in a condition (FIG. 15A) in which the entire of given physical antennas transmits the same power when it is assumed that the number of actual physical antennas is 64. Specifically, FIGS. 15A and 15 illustrate a beam that is formed using 64 arrangement antennas and that has a beam width of 40°.

Figure 16A:
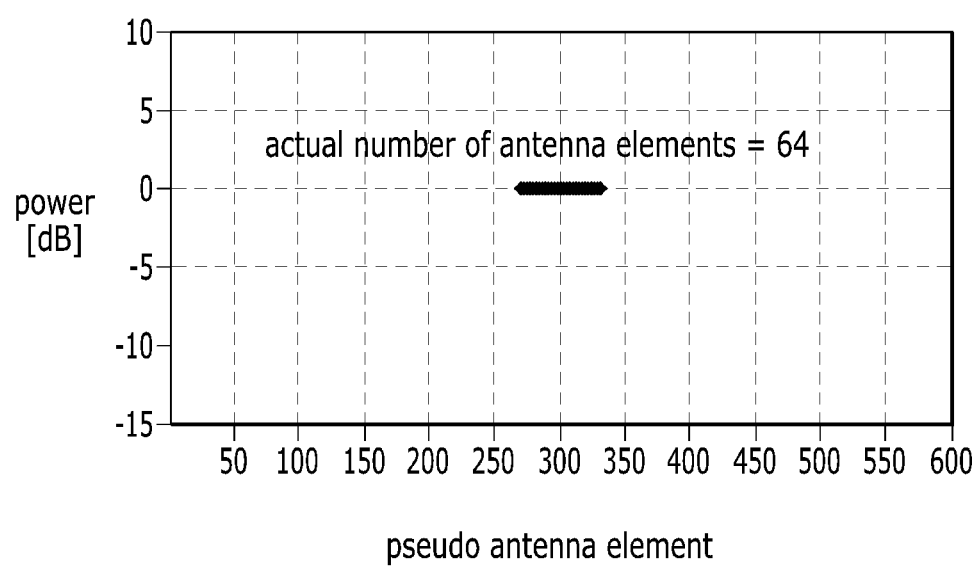
FIGS. 16A and 16B are graphs illustrating a beam that is formed using 64 arrangement antenna and that has a beam width of 20°.
Figure 16B:
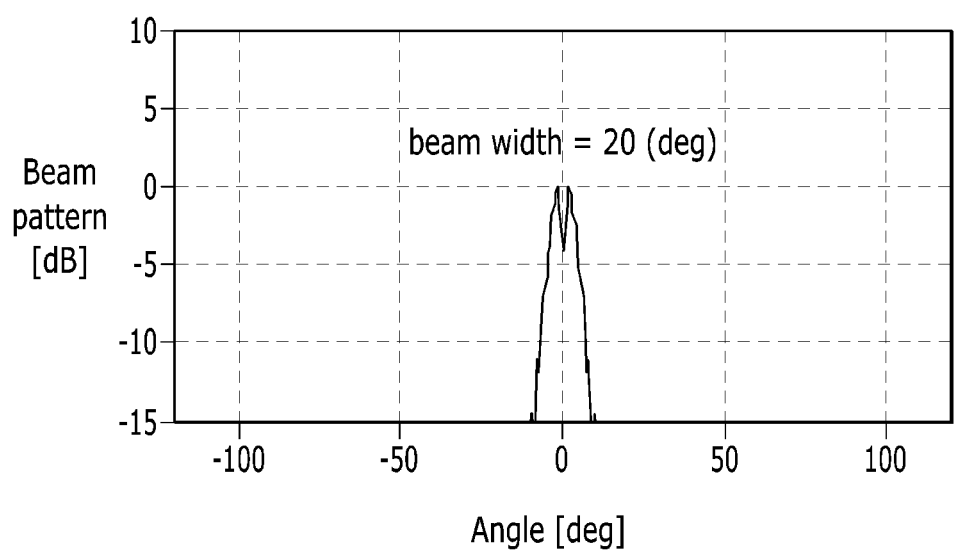

FIGS. 16A and 16B illustrate a simulation result in which a beam width becomes 20° (FIG. 16B) in a condition (FIG. 16A) in which the entire of given physical antennas transmits the same power when it is assumed that the number of actual physical antennas is 64. Specifically, FIGS. 16A and 16B illustrate a beam that is formed using 64 arrangement antennas and that has a beam width of 20°.

Here, the number of pseudo antennas in FIGS. 14A and 14B is 100, the number of pseudo antennas in FIGS. 15A and 15B is 300, and the number of pseudo antennas in FIGS. 16A and 16B is 600. As a duty duration of a relative box function is gradually shortened, a formed beam width gradually reduces to be 90° (FIG. 14B), 40° (FIG. 15B), and 20° (FIG. 16B). That is, as illustrated in FIGS. 14 to 16, a duty duration of a box function reduces and thus it looks like that a width of a beam together reduces.

The BS may perform the above-described beam width control as follows.

The BS configures $NP_1$ (e.g., in FIGS. 14 to 16, $NP_1$=100, 300, or 600), which is the number of pseudo antenna ports for controlling a beam width to be larger than $NP_2$ (e.g., in FIGS. 14 to 16, $NP_2$=64), which is the number of physical antenna ports. Specifically, when generating a beam having a large beam width, the BS may configure $NP_1$ to a high value. Alternatively, when generating a beam having a small beam width, the BS may configure $NP_1$ to a small value. For example, as illustrated in FIGS. 14A and 14B, when generating a beam having a beam width of 90°, the BS may configure $NP_1$ to 100, and as illustrated in FIGS. 16A and 16B, when generating a beam having a beam width of 20°, the BS may configure $NP_1$ to 600. As a value of $NP_1$ increases, it looks like that a duty duration of the above-described box function reduces.

The BS precodes first data stream for a virtual antenna port based on a precoding vector (or virtual antenna mapping vector) for the virtual antenna port, thereby generating the $NP_1$ number of second data streams. Specifically, when the number of virtual antenna ports is $NP_3$ (e.g., 4), the BS precodes the $NP_3$ number of first data streams for the $NP_3$ number of virtual antenna ports based on the $NP_3$ number of precoding vectors for the $NP_3$ number of virtual antenna ports, thereby generating the ($NP_3 \times NP_1$) number of second data streams. The BS may generate a precoding vector (or virtual antenna mapping vector) using a method (e.g., method MD10, method MD20) that is described in this specification. When generating a precoding vector, the BS may enable the remaining elements, except for $NP_2$ among elements of the precoding vector to be 0. Specifically, the BS may generate a precoding vector having superordinate partial elements having a value of 0 and subordinate partial elements having a value of 0. The element number of the precoding vector may be the same as that of $NP_1$.

The BS generates the $NP_2$ number of third data streams using a portion of the $NP_1$ number of second data streams corresponding to each virtual antenna port. Specifically, the BS may generate the $NP_2$ number of third data streams using data stream from ($NP_1/2-NP_2/2+1$)th second data stream to ($NP_1/2+NP_2/2$)th second data stream among second data streams corresponding to each virtual antenna port. For example, when $NP_3$=2 (p=0,1), the BS multiple-channel adds each of the $NP_2$ number of second data streams among the $NP_1$ number of second data streams for a virtual antenna port (p=0) and each of the $NP_2$ number of second data streams among the $NP_1$ number of second data streams for a virtual antenna port (p=1), thereby generating the $NP_2$ number of third data streams. Here, a multiple-channel adding method is the same as or similar to the multiple-channel adding method that is described in FIGS. 3 and 4.

The BS maps the $NP_2$ number of third data streams to the $NP_2$ number of physical antenna ports. In order to form a beam, the BS turns the entire of the $NP_2$ number of physical antenna ports into a power-on state, regardless of a beam width (regardless of whether a beam width is broad or sharp).

By adjusting at least one of circular shift values (e.g., in the above-described pseudo code, a value of a parameter sh) that is applied to a Zadoff-Chu sequence and a DFT vector sequence for generating a precoding vector (or virtual antenna mapping vector), the BS may control a phase of a beam. For example, when generating a first beam and a second beam having the same beam width and that are orthogonal to each other, the BS may configure $NP_1$ for each of a first beam and a second beam to the same value and may differently configure a circular shift value for the first beam and a circular shift value (e.g., a value larger by 2 samples than a circular shift value for the first beam) for the second beam.

Figure 17:
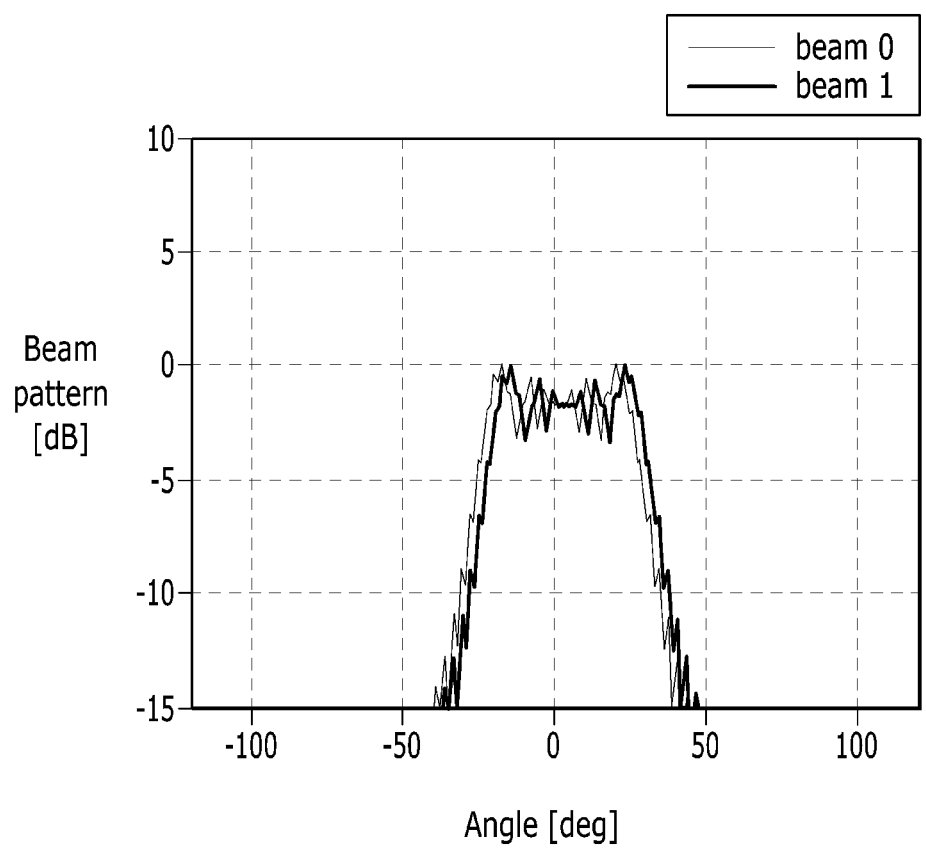
FIG. 17 is a graph illustrating a beam width control result of two beam signals that are generated using a virtual antenna mapping vector according to an exemplary embodiment of the present invention.

FIG. 17 is a graph illustrating a beam width control result of two beam signals (beam0, beam1) that are generated using a virtual antenna mapping vector according to an exemplary embodiment of the present invention.

As illustrated in FIG. 17, the BS may generate a physical antenna mapping vector of a virtual antenna using a method according to the foregoing exemplary embodiment of the present invention, form two beams using the generated physical antenna mapping vector, but generate a beam signal (beam0 and beam1) having a beam width of 90° by controlling a beam width.

The reason why shapes of two beam signals (beam0 and beam1) of FIG. 17 are similar is that a relative phase difference (or circular shift value difference, e.g., 2 samples) between two beam signals (beam0 and beam1) is not largely configured to find a correlation between beams. However, because a used sequence is a Zadoff-Chu sequence, an auto-correlation characteristic is excellent and thus even if a difference of only 1 sample occurs, it may be determined through a simulation that a fading characteristic is independently represented in a time domain.

As described above, by the same method as a method of forming two beams, 4 beams or 8 beams or more may be controlled to have the same direction or the same beam width.

According to the foregoing exemplary embodiment of the present invention, when the BS generates a plurality of overlapped beams (orthogonally overlapped beams), the BS can obtain a diversity gain using each beam. This may be described through a simulation result of FIG. 18.

Figure 18:
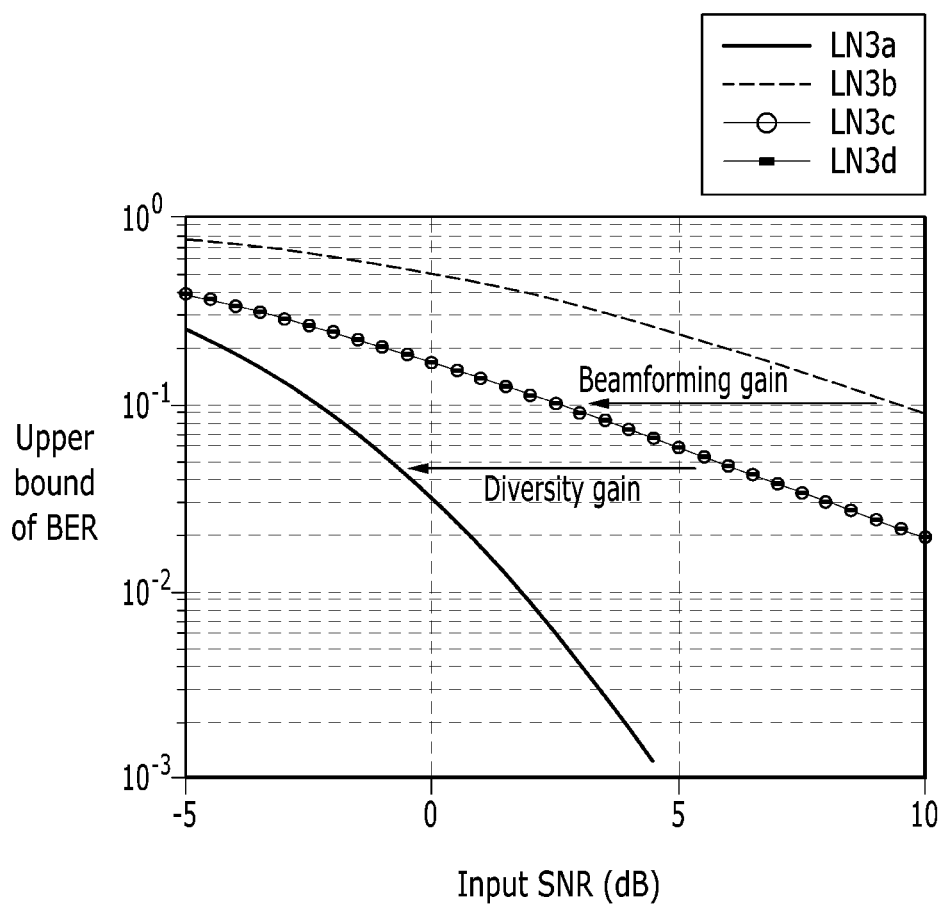
FIG. 18 is a graph illustrating a performance simulation result of a beamforming gain and a diversity gain.

FIG. 18 illustrates a performance simulation result of a beamforming gain and a diversity gain. In FIG. 18, a horizontal axis represents an input signal to noise ratio (SNR), and a vertical axis represents an upper bound of a BER.

In FIG. 18, a graph LN3*b* represents a case in which beamforming is not used and in which antennas are uncorrelated, a graph LN3*c* represents a case in which beamforming is used and in which antennas are correlated, a graph LN3*d* represents a case in which beamforming is not used and in which antennas are correlated, and a graph LN3*a* represents a case in which beamforming is used and in which formed beams are uncorrelated.

Compared with the graph LN3*b* and the graphs LN3*c* and LN3*d*, when a correlation between antennas is large, it can be seen that it is advantageous to obtain a beamforming gain. Compared with the graphs LN3*c* and LN3*d* and the graph LN3*a*, when formed beams are uncorrelated, it can be seen that it is advantageous to obtain a diversity gain. That is, the BS obtains a diversity gain through each beam as well as a beamforming gain and thus a performance of the system can be largely increased. Therefore, according to the foregoing exemplary embodiment of the present invention, when the BS generates a plurality of overlapped beams, a diversity gain can be obtained using each beam.

Figure 19:
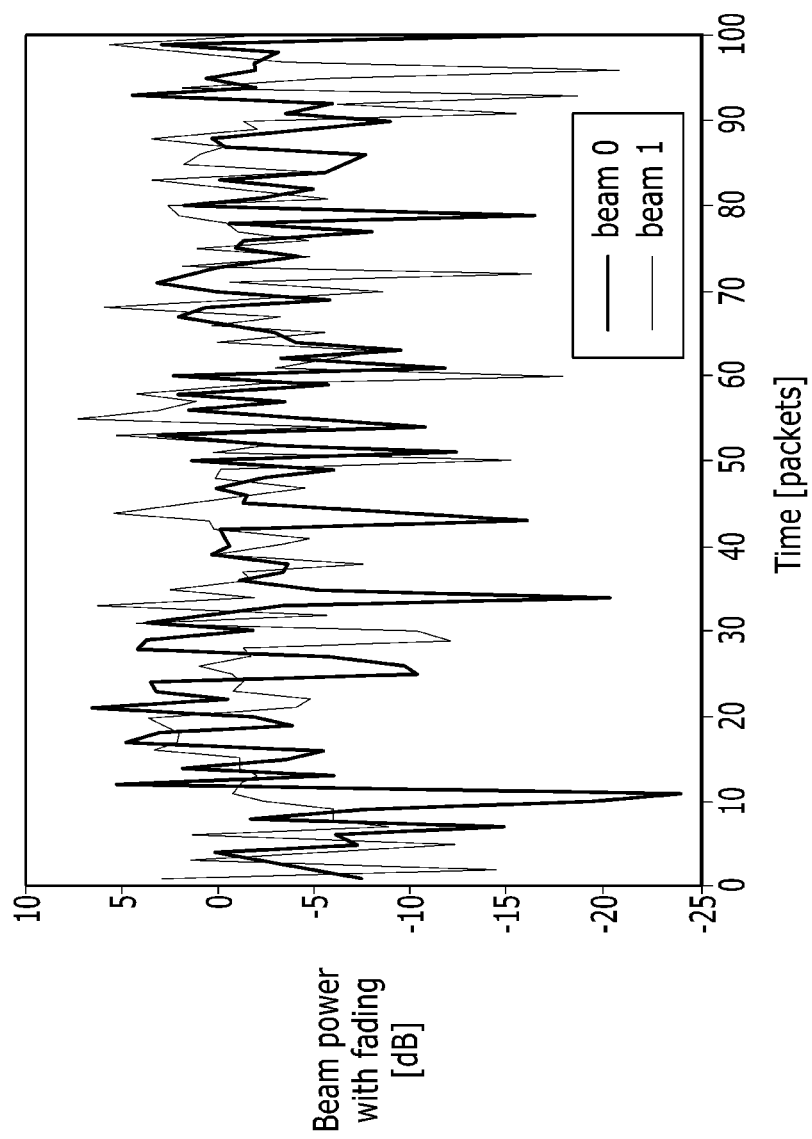
FIG. 19 is a graph illustrating a sequential transmission power change in a fading radio channel of two beam signals.

FIG. 19 is a graph illustrating a sequential transmission power change in a fading radio channel of two beam signals. Specifically, FIG. 8 illustrates that transmission power of two beam signals (beam0 and beam1) that are generated using a virtual antenna mapping vector sequentially changes in a fading radio channel according to an exemplary embodiment of the present invention.

As illustrated in FIG. 19, it can be seen that a change of a beam signal (beam0) and a change of a beam signal (beam1) are independent.

Figure 20:
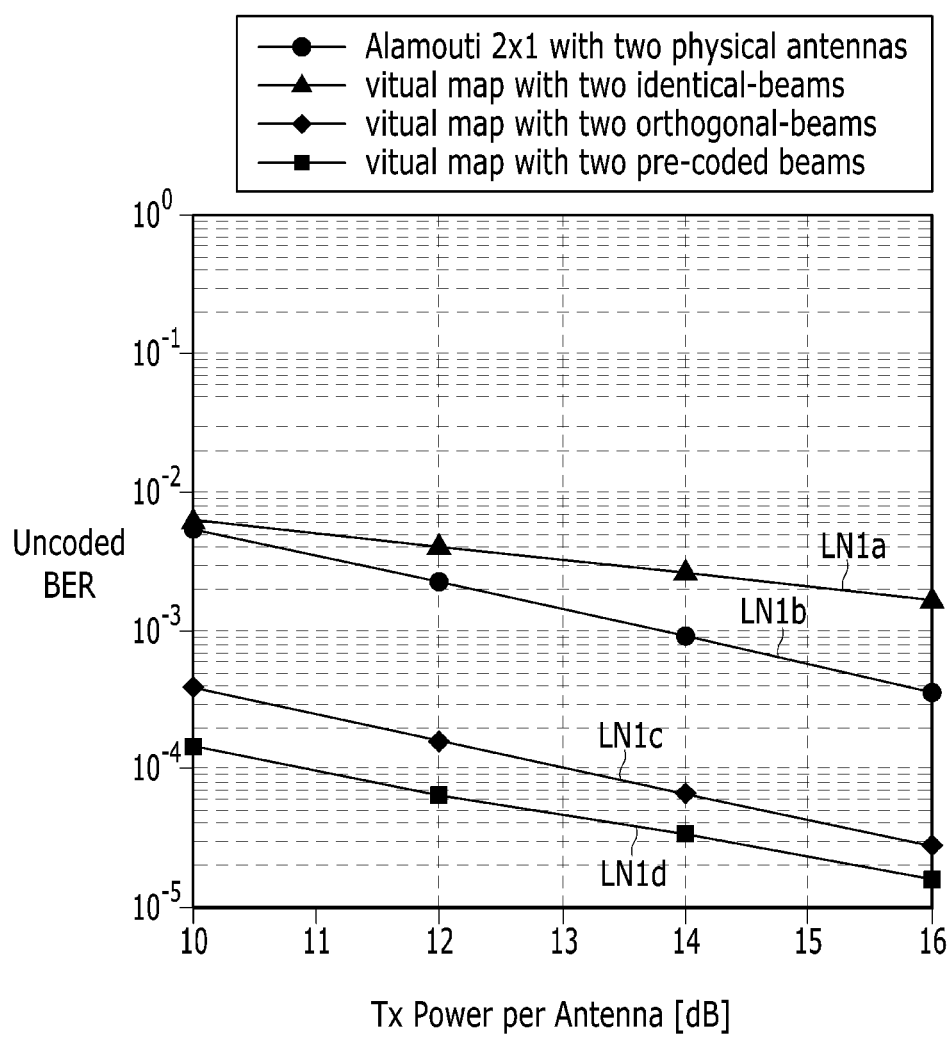
FIG. 20 is a graph illustrating a bit error rate (BER) per unit antenna transmission power, when a transmitting and receiving modulation method is quadrature phase shift keying (QPSK).

FIG. 20 is a graph illustrating a bit error rate (BER) per unit antenna transmission power, when a transmitting and receiving modulation method is quadrature phase shift keying (QPSK).

Figure 21:
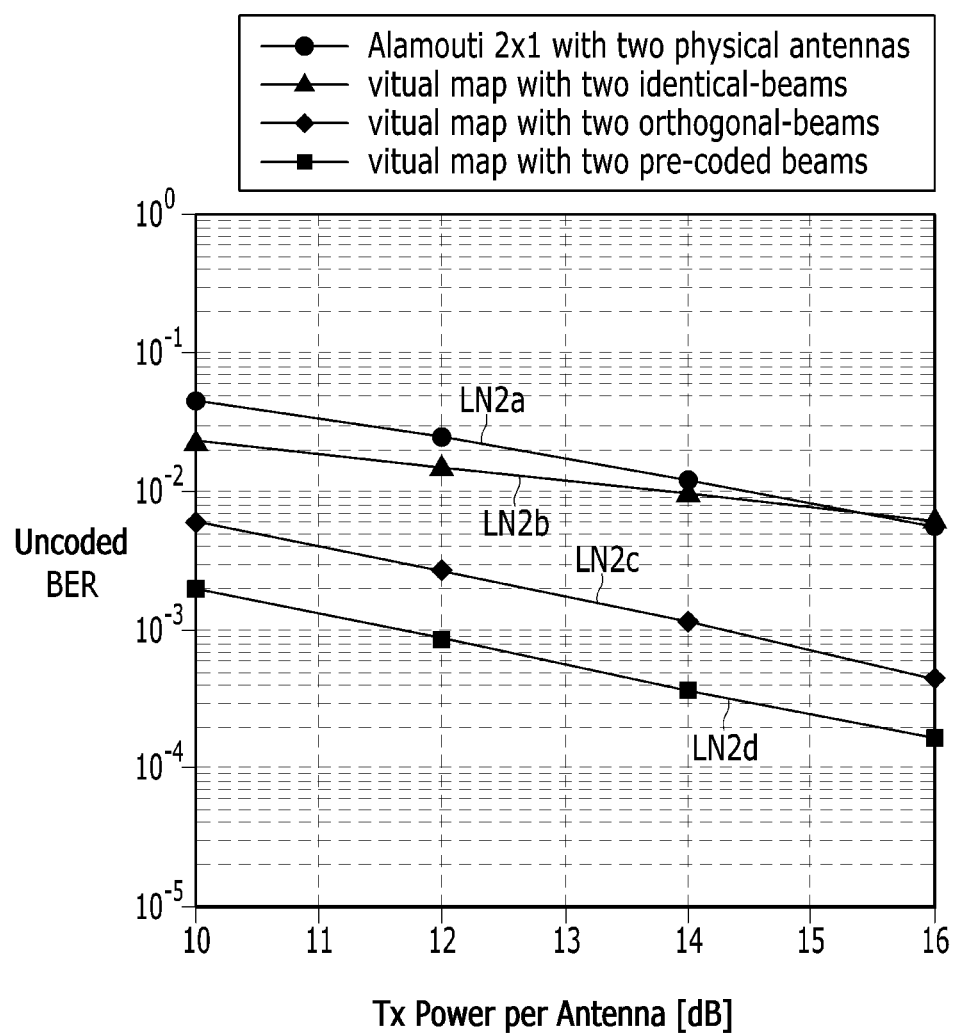
FIG. 21 is a graph illustrating a BER per unit antenna transmission power, when a transmitting and receiving modulation method is 16 quadrature amplitude modulation (QAM).

FIG. 21 is a graph illustrating a BER per unit antenna transmission power, when a transmitting and receiving modulation method is 16 quadrature amplitude modulation (QAM).

Specifically, FIGS. 20 and 21 illustrate an uncoded BER result per unit antenna transmission power when transmitting data using a virtual antenna mapping vector according to an exemplary embodiment of the present invention.

In FIG. 20, a graph LN1*c* represents a result of a transmitting and receiving system SY10 that is illustrated in FIG. 6, and a graph LN1*d* represents a result of a transmitting and receiving system SY10 that is illustrated in FIG. 7. In FIG. 20, graphs LN1*a* and LN1*b* represent a result of an existing transmitting and receiving system.

In FIG. 21, the graph LN2*c* represents a result of the transmitting and receiving system SY10 that is illustrated in FIG. 6, and the graph LN2*d* represents a result of the transmitting and receiving system SY20 that is illustrated in FIG. 7. In FIG. 21, graphs LN2*a* and LN2*b* represent a result of an existing transmitting and receiving system.

As illustrated in FIGS. 20 and 21, it can be seen that a transmitting and receiving system according to an exemplary embodiment of the present invention has a bit error performance more excellent than that of an existing transmitting and receiving system. That is, a transmitting and receiving system according to an exemplary embodiment of the present invention always has an excellent bit error performance regardless of other factors such as a modulation method.

Figure 22:
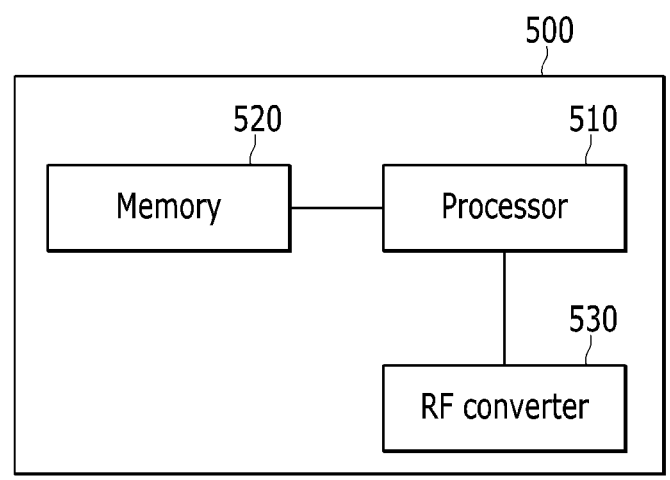
FIG. 22 is a block diagram illustrating a configuration of a base station according to an exemplary embodiment of the present invention.

FIG. 22 is a block diagram illustrating a configuration of a BS 500 according to an exemplary embodiment of the present invention.

The BS 500 further includes a processor 510, a memory 520, and an RF converter 530 as well as a configuration of the above-described BS.

The processor 510 may be formed to implement a function, a procedure, and a method that are described in relation to the BS in this specification. Further, the processor 510 may control each configuration of the BS 500.

The memory 520 is connected to the processor 510 and stores various information that is related to operation of the processor 510.

The RF converter 530 is connected to the processor 510 and transmits or receives a wireless signal.

Figure 23:
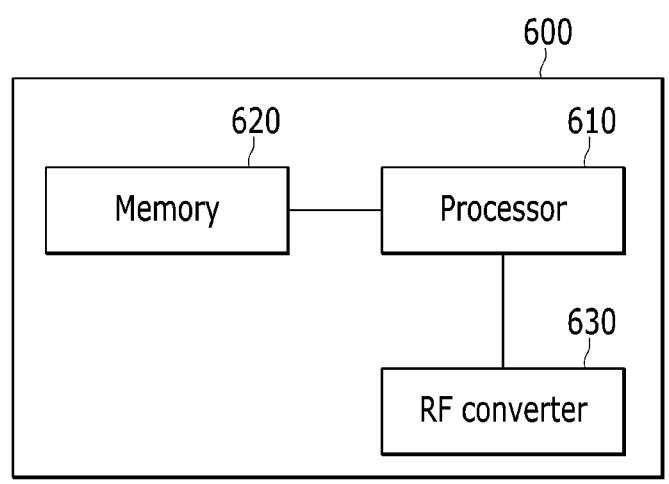
FIG. 23 is a block diagram illustrating a configuration of a terminal according to an exemplary embodiment of the present invention.

FIG. 23 is a block diagram illustrating a configuration of a terminal 600 according to an exemplary embodiment of the present invention.

The terminal 600 further includes a processor 610, a memory 620, and an RF converter 630 as well as a configuration of the above-described terminal.

The processor 610 may be formed to implement a function, a procedure, and a method that are described in relation to the terminal in this specification. Further, the processor 610 may control each configuration of the terminal 600.

The memory 620 is connected to the processor 610 and stores various information that is related to operation of the processor 610.

The RF converter 630 is connected to the processor 610 and transmits or receives a wireless signal. The terminal 600 may have a single antenna or a multiple antenna.

According to an exemplary embodiment of the present invention, data is virtually transmitted through the small number of virtual antennas, but data may be actually (or physically) transmitted through the many number of physical antennas.

Further, according to an exemplary embodiment of the present invention, upon antenna virtualization, in each physical antenna, full power utilization may be performed.

Further, according to an exemplary embodiment of the present invention, upon antenna virtualization, a transmitting and receiving performance of physical channels (e.g., physical downlink control channel (PDCCH) or physical downlink shared channel (PDSCH) of Rel. 8 LTE specification) can be optimized.

Further, according to an exemplary embodiment of the present invention, ports of LTE-A may equally use a method of mapping a virtual antenna port to a physical antenna port regardless of whether a radio resource block (or subframe) exists.

Further, according to an exemplary embodiment of the present invention, in an entire method of a 2 dimension (2D) arrangement antenna and a 3 dimension (3D) arrangement antenna, an optimal transmission performance can be provided.

Further, wireless transmission technology through a high frequency signal and a superhigh frequency signal will be introduced in the future, and in such a case, beamforming technology becomes essential technology. In this case, because a broad beam in some case as well as a sharp beam is required, in a system such as IEEE 802.11 ad, beam width control technology through MAC corresponds to standard technology. According to an exemplary embodiment of the present invention, a most economic and effective beam width control method can be provided.

Further, according to an exemplary embodiment of the present invention, beams that are overlapped with a phase difference of an occurrence sequence may be generated. Thereby, a beamforming gain and a diversity gain can be simultaneously obtained, and thus a performance of a system can be largely enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a transmitter maps a plurality of virtual antenna ports to a plurality of physical antenna ports, the method comprising:

generating a plurality of first shift sequences by circular shifting a first sequence having a constant magnitude in a time domain and a frequency domain;

generating a plurality of second shift sequences by circular shifting a discrete Fourier transform (DFT) vector sequence;

generating a plurality of precoding vectors for the plurality of virtual antenna ports using the plurality of first shift sequences and the plurality of second shift sequences; and mapping a plurality of first data streams for the plurality of virtual antenna ports to the plurality of physical antenna ports using the plurality of precoding vectors, wherein the generating of a plurality of precoding vectors comprises:

randomly selecting one of the plurality of first shift sequences;

randomly selecting one of the plurality of second shift sequences; and generating a first precoding vector of the plurality of precoding vectors for beamforming by using the selected first shift sequence and the selected second shift sequence.

2. The method of claim 1, wherein the generating of a plurality of first shift sequences comprises:

generating a Zadoff-Chu sequence, which is a first sequence, using Equation 1

$$x_q(m) = e^{-j\frac{\pi q m(m+1)}{N_{ZC}}},  \quad [\text{Equation 1}]$$
$$0 \le m \le N_{ZC} - 1$$

or $$x_q(m) = e^{-j\frac{\pi q m^2}{N_{ZC}}},$$
$$0 \le m \le N_{ZC} - 1$$

($x_q(\ )$:Zadoff-Chu sequence of a q-th root, $N_{ZC}$:length of a Zadoff-Chu sequence) ; and generating the plurality of first shift sequences by circular shifting the first sequence using a different plurality of first shift values.

3. The method of claim 2, wherein the generating of a plurality of second shift sequences comprises:

generating the DFT vector sequence; and generating the plurality of second shift sequences by circular shifting the DFT vector sequence using a different plurality of second shift values.

4. The method of claim 1, wherein the generating of the first precoding vector comprises generating the first precoding vector by the scalar product of the selected first shift sequence and the selected second shift sequence.

5. The method of claim 1, wherein the mapping of a plurality of first data streams comprises:

generating the (M×N) number (M>N) of second data streams by precoding the N number (N is the natural number of 2 or more) of first data streams based on the N number of precoding vectors;

multiple-channel adding the N number of second data streams of the (M×N) number of second data streams; and mapping the multiple-channel added data streams to one of the M number of physical antenna ports.

6. The method of claim 1, wherein the transmitter has a multiple input multiple output (MIMO) antenna.

* * * * *

UNITED STATES PATENT AND TRADEMARK OFFICE
CERTIFICATE OF CORRECTION

| | |
|---|---|
| PATENT NO. | : 9,806,778 B2 |
| APPLICATION NO. | : 14/937960 |
| DATED | : October 31, 2017 |
| INVENTOR(S) | : Seok Ho Won et al. |

It is certified that error appears in the above-identified patent and that said Letters Patent is hereby corrected as shown below:

On the Title Page

Item (72) Inventor:

Replace "Il Gyu KIM, Chungcheongbuk-Do (KR)" with --Il Gyu KIM, Okcheon-Gun Chungcheongbuk-Do (KR)--

Signed and Sealed this
Twenty-fourth Day of April, 2018

Andrei Iancu
*Director of the United States Patent and Trademark Office*